United States Patent
Volpato et al.

(10) Patent No.: US 12,042,955 B2
(45) Date of Patent: Jul. 23, 2024

(54) METHOD AND APPARATUS FOR PREPARING AND DISPENSING A MIXTURE OBTAINED BY MIXING CHEMICALLY REACTIVE COMPONENTS, AT LEAST ONE OF WHICH CONTAINING A FILLER MATERIAL

(71) Applicant: AFROS S.P.A., Milan (IT)

(72) Inventors: Marco Volpato, Milan (IT); Maurizio Corti, Milan (IT); Luca Campi, Milan (IT)

(73) Assignee: AFROS S.P.A. (IT)

( * ) Notice: Subject to any disclaimer, the term of this patent is extended or adjusted under 35 U.S.C. 154(b) by 652 days.

(21) Appl. No.: 17/224,435

(22) Filed: Apr. 7, 2021

(65) Prior Publication Data

US 2021/0308906 A1 Oct. 7, 2021

(30) Foreign Application Priority Data

Apr. 7, 2020 (IT) .................. 102020000007363

(51) Int. Cl.
*B29B 7/24* (2006.01)
*B29B 7/00* (2006.01)
(Continued)

(52) U.S. Cl.
CPC .............. *B29B 7/244* (2013.01); *B29B 7/005* (2013.01); *B29B 7/28* (2013.01); *B29B 7/7404* (2013.01); *B29B 7/801* (2013.01); *B29B 7/90* (2013.01)

(58) Field of Classification Search
CPC ..... B29B 7/488; B29B 7/7684; B29B 7/7689; B29B 7/7694; B29B 7/80; B29B 7/7631;
(Continued)

(56) References Cited

U.S. PATENT DOCUMENTS 4,126,399 A 11/1978 Schneider et al.
4,175,874 A * 11/1979 Schneider ............. B29B 7/7668
366/159.1
(Continued)

FOREIGN PATENT DOCUMENTS

GB 2148786 A 6/1985

*Primary Examiner* — Charles Cooley
(74) *Attorney, Agent, or Firm* — Laubscher & Fretwell, P.C.

(57) ABSTRACT

A method is disclosed for preparing and dispensing a mixture obtained by mixing at least one first chemically reactive component and at least one second chemically reactive component containing a dispersed solid material by a high pressure mixing device comprising a mixing chamber for mixing the components, in which a valve member is slidable, in particular a slide-valve, provided with longitudinal slots for recirculating the components to respective storage tanks. The method provides removing from at least one tank, a dosed quantity of the at least second chemically reactive second component to with filler material is added; recirculating the second component through the slots of the slide-valve for a period of time that is comparatively very reduced with respect to a recirculating step of the at least first component through the slide-valve. An apparatus for preparing and dispensing the mixture is also disclosed.

41 Claims, 15 Drawing Sheets

(51) Int. Cl.
*B29B 7/28* (2006.01)
*B29B 7/74* (2006.01)
*B29B 7/80* (2006.01)
*B29B 7/90* (2006.01)

(58) Field of Classification Search
CPC .......... B29B 7/244; B29B 7/005; B29B 7/28; B29B 7/7404; B29B 7/801; B29B 7/90; B29B 7/726; B29B 7/728; B29B 7/7615; F16J 15/0887; F16J 15/46; F16J 15/545; B01F 2035/351; B01F 35/00; B29C 43/52; B29C 2043/028; B29C 43/36; B29C 43/027; B29C 67/246; B29C 44/3442; B29C 44/60; B29K 2027/16; B29K 2027/18; B29L 2031/26; B29L 2031/265
USPC ......... 366/162.4, 162.5, 167.1, 173.1, 159.1; 422/131, 133–135
See application file for complete search history.

(56) References Cited

U.S. PATENT DOCUMENTS

| | | | |
|---|---|---|---|
| 4,195,527 A | | 4/1980 | Ebeling et al. |
| 4,257,992 A | * | 3/1981 | Schulte .................. F04B 13/00 |
| | | | 264/DIG. 83 |
| 4,378,335 A | | 3/1983 | Boden et al. |
| 5,082,633 A | | 1/1992 | Stuper |
| 5,615,949 A | * | 4/1997 | Morano ................ B29B 7/7694 |
| | | | 366/159.1 |
| 6,261,486 B1 | | 7/2001 | Sulzbach et al. |
| 11,104,039 B2 | * | 8/2021 | Renkl ....................... B29B 7/80 |
| 2008/0002519 A1 | * | 1/2008 | Soechtig ............... B29B 7/7694 |
| | | | 366/159.1 |
| 2010/0137508 A1 | * | 6/2010 | Corti ........................ B29B 7/88 |
| | | | 524/590 |
| 2012/0300574 A1 | * | 11/2012 | Fiorentini ............. B29B 7/7694 |
| | | | 425/117 |
| 2021/0308906 A1 | * | 10/2021 | Volpato .................. B29B 7/726 |

* cited by examiner

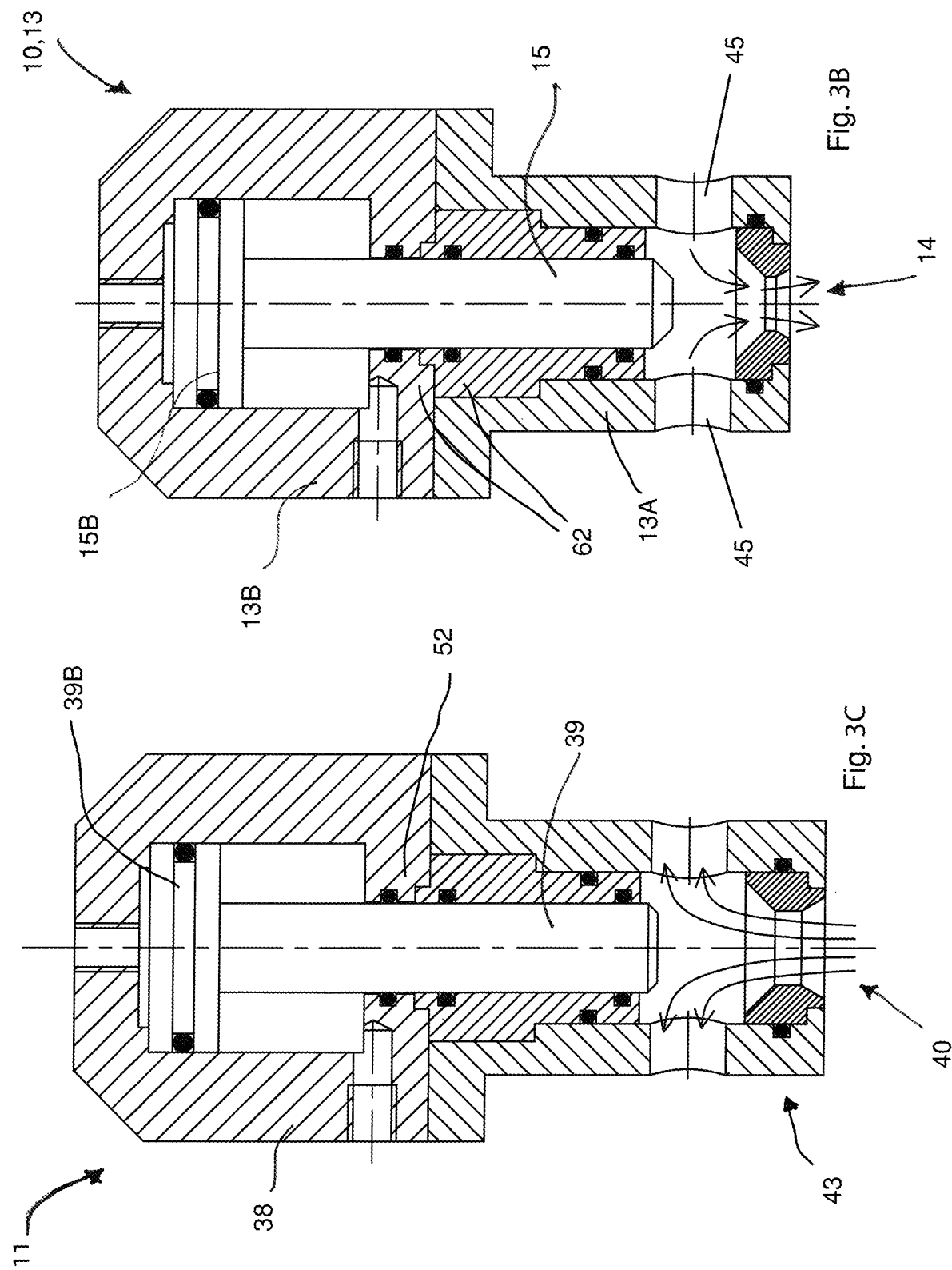

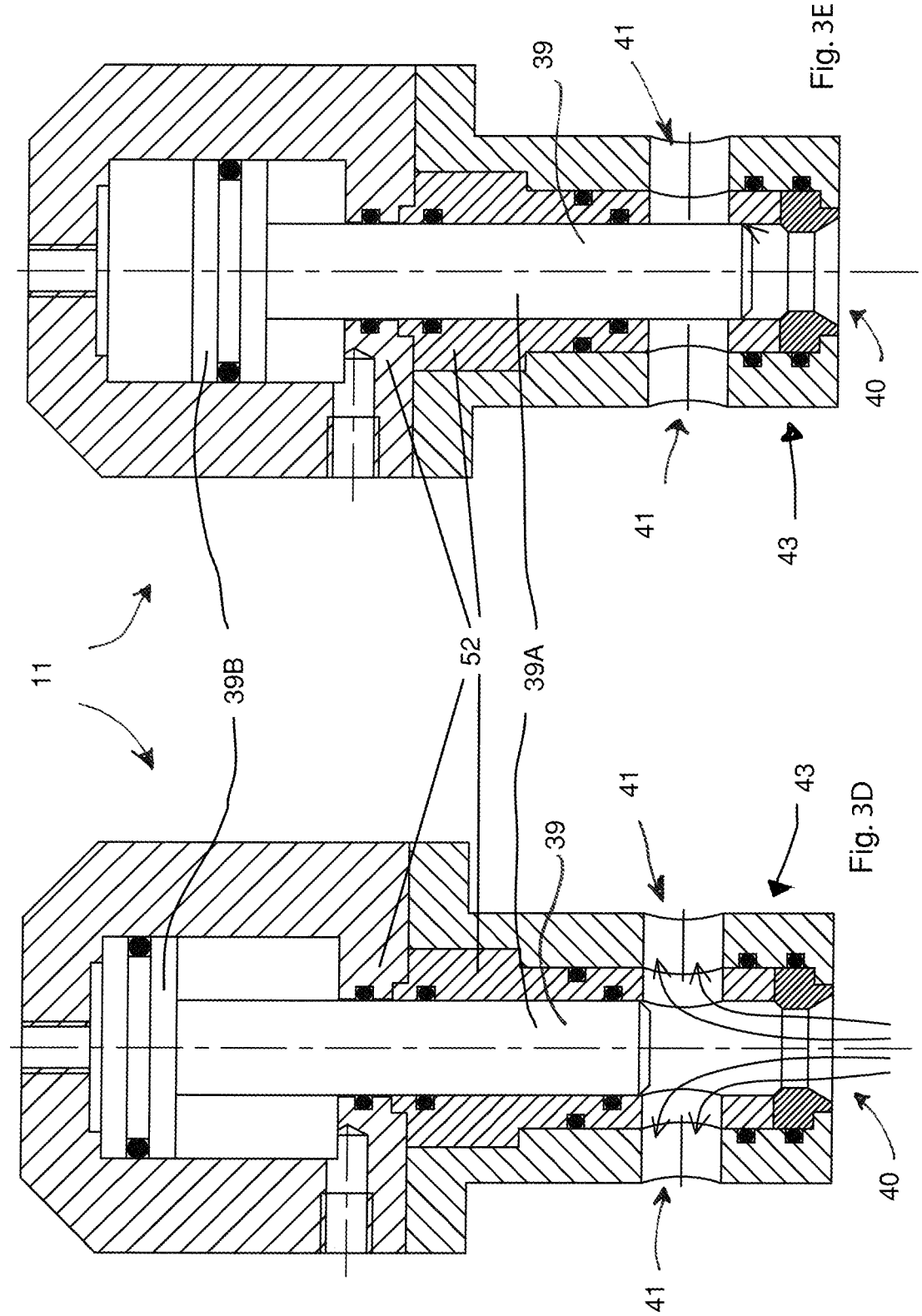

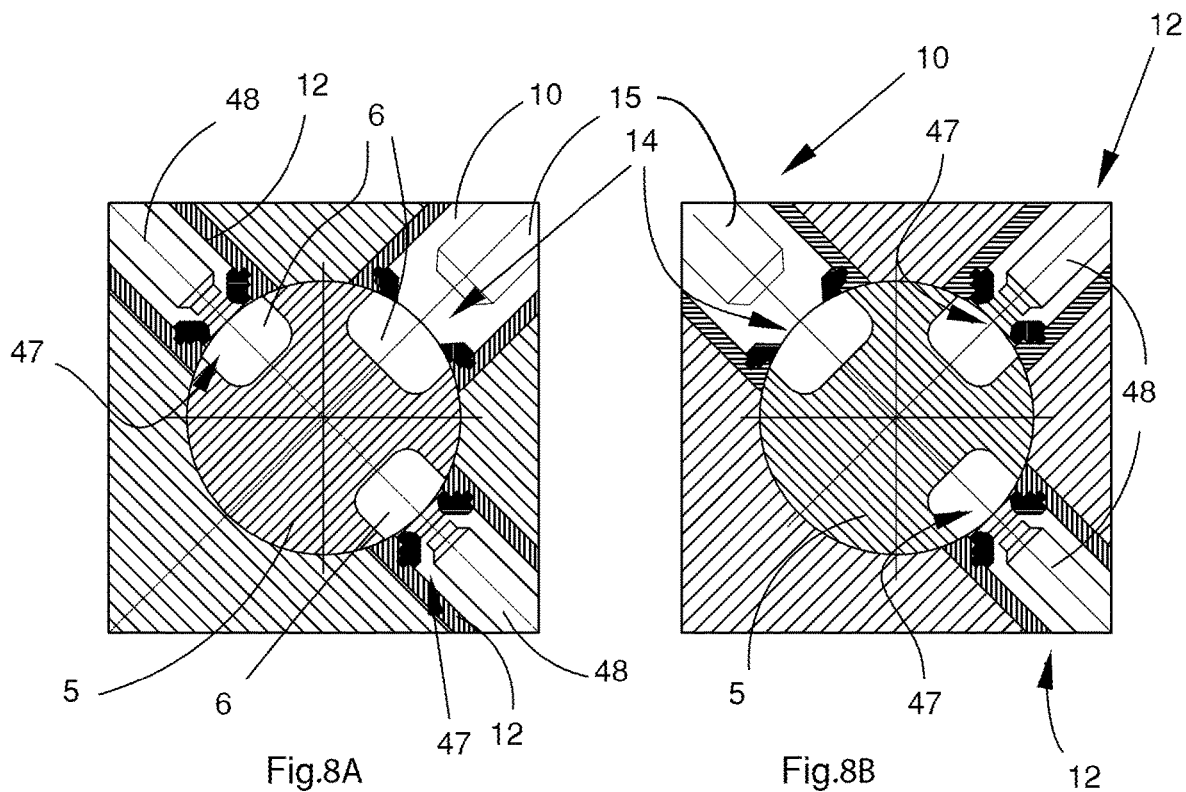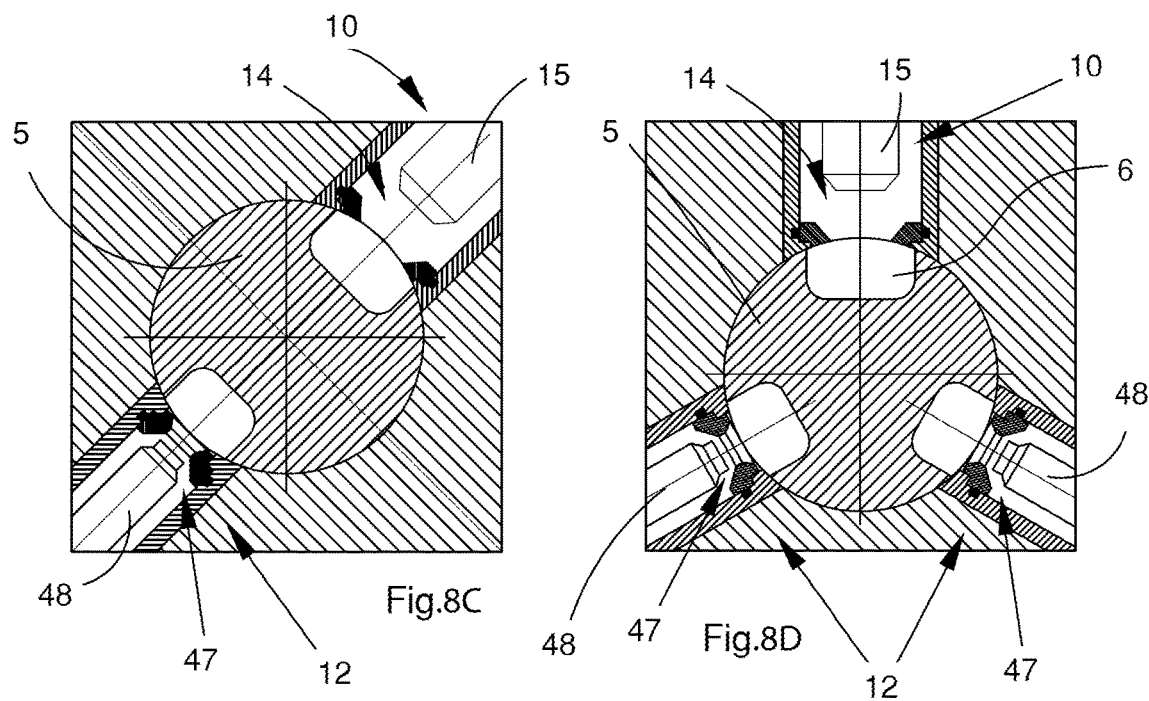

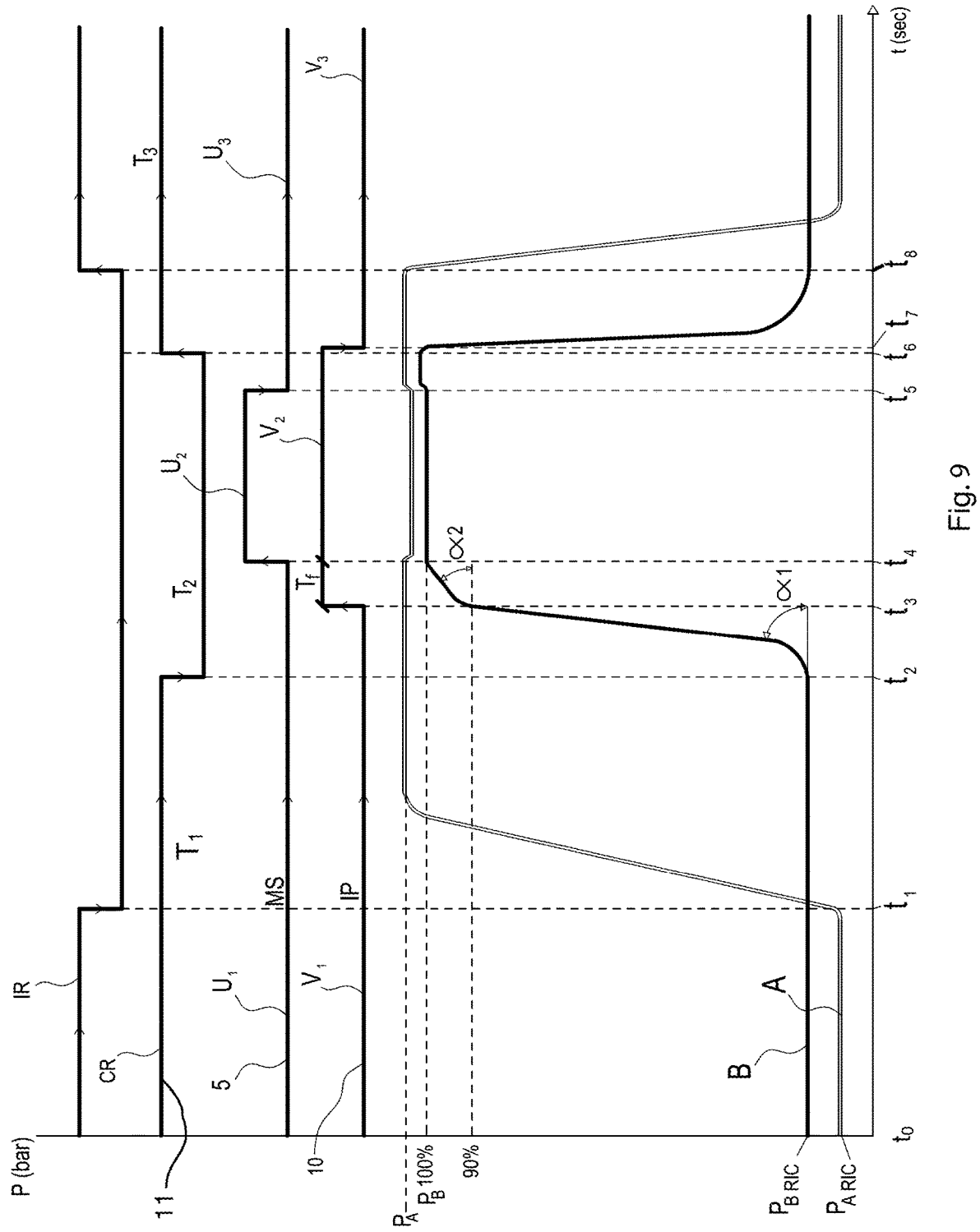

METHOD AND APPARATUS FOR PREPARING AND DISPENSING A MIXTURE OBTAINED BY MIXING CHEMICALLY REACTIVE COMPONENTS, AT LEAST ONE OF WHICH CONTAINING A FILLER MATERIAL

BACKGROUND OF THE INVENTION

The present invention relates to a method and an apparatus for mixing and dispensing chemically reactive components, at least at least one of which is loaded with a solid-state filler or has the filler added that is dispersed in the form of flakes, wavers, sheets, in granular or broken fibre or in the form of full or hollow balls.

In particular, the mixture obtained from mixing the aforesaid chemically reactive components is a reactant resin of thermosetting type for example a resin of polyurethane, phenol, epoxy, silicone type or of another type, in particular provided with improved fire resistance features and/or also provided with further improved and specific mechanical/chemical/physical properties arising from the presence of the solid parts dispersed in the resin matrix.

This mixture is suitable for producing by reaction moulding (e.g. by foaming) various semi-compact and compact foam-shaped products, for example to generate layers of expanded isolating foam refrigerator cabinets, refrigerator cabinet doors, thermal insulation panels, chair arm cushions or other padding, noise transmission shielding, noise transmission shields, or in the form of compact elements, for example cladding panels for residential and industrial buildings, doors and profiles for doors and windows, for motor vehicles, bodywork pieces, impregnated elements for composites, templates for furnishings and other types of product.

Systems have been known for some time for moulding different parts and objects by chemically reactive polymeric mixtures.

The products obtained by thermosetting reaction and possible expansion in the form of foam can comprise refrigerator cabinets, panel elements for heat insulation of buildings, products for the automotive sector, fixtures, mattresses or cushions, elements for reducing vibrations and transmitting noise and many other elements in the form of foam or elements in compact or semi-compact form. As can be easily imagined, the presence of foam for thermal and acoustic insulation is today widespread and is found in many contexts and environments lived in daily now by part of the world population.

In recent years the trend has become more pronounced—accompanied by corresponding provisions and/or regulations at the EU and world level—to pay great attention to energy saving, reducing the environmental impact, protecting health, comfort and safety in domestic and workplace settings, with particular regard to acoustic and thermal insulations, reducing VOC ("Volatile Organic Compounds") emissions and reducing the risk of fires and the emission of toxic fumes.

In order to deal with the aforesaid trends and needs and in conformity to the various directives and standards emitted in this regard, in the prior art wide use is made of the aforesaid polymer foams, which are often combined with stiff supports made of another material (e.g. plastics or sheet material) owing to their significant thermal acoustic insulating capacity and capacity to be glued to several components.

Closed-cell polymer foams are used when the main function required of them is the structural and thermal insulation function.

Open-cell polymer foams—through which air can circulate—are on the other hand used—when the production of flexible products is requested that are particularly suitable for the production of mattresses, cushions or other furnishing products that breathe and are able to provide comfortable flexible support and for the production of soundproofing, damping and thermally insulating elements.

Certain types of polyurethane foam, obtained from the process of expansion during the release of gas during the chemical reaction of two liquid reactive resins, at the end of the polymerization process, are provided with the features of lightness and flexibility required as cladding of carpets of the bottom of interiors and of transport vehicles in general, and as acoustic insulation in parts and appliances of some types of household appliances that would otherwise emit more heat and noise in domestic environments.

With specific reference to household appliances and automobiles, in addition to the soundproofing, vibration-damping and thermally insulating function, also a fire-resistant, flame-retardant and smoke-emission containing property is required for obvious reasons of safety, and following particularly disastrous fire events that have occurred in the last years. As a result of these events, in Europe, USA and the Far East, various governments are drawing up legislation that requires the use of materials with specific features of resistance to fire and fume-limiting features, and simultaneously the authorities assigned to protecting health are issuing provisions for reducing emissions of volatile organic compounds (VOCs), that are damaging and harmful to people, that are contained in and emitted by different materials and plastics intended for the interiors of dwellings and means of transport.

In flexible polyurethane foams, halogen-based liquid compounds like bromine (now banned) and chlorine, (liquid or solid) phosphorus-based compounds or (solid) fillers obtained from rocks or from chemical compounds (for example calcium or magnesium carbonate, aluminium hydroxide, etc) can be used as flame retardants.

These flame-retardant compounds have applicational limits and different restrictions depending on the danger of the volatile emissions, on environmental hazard of disposal at end of life, on emission of toxic fumes in the event of fire, on weight and poor suitability for use in means of transport or also on poor resistance to fire.

In this context, the use of expandable graphite as a filler is becoming widespread, owing to the great environmental compatibility thereof, the great capacity thereof to inhibit the transmission of flames and owing to the capability thereof the emission of toxic fumes and the reduced weight. Further, the expandable graphite is compatible with the properties of the foams.

Graphite is a carbon compound the crystalline structure of which is typically configured in layers, each layer having very strong molecular bonds internally and weak bonds with the adjacent layers.

With specific treatments, a layer of solid compound is formed between the single layers of graphite that melts and swells at temperatures just above 200° C. Thus there is a tendency to expansion in the presence of great heat and fire, this material being called because of this behaviour "expandible graphite".

In the presence of flames, this type of graphite expands because of liquefaction and an increase in the volume of the melting separating layer, generating formation of a grid with surface thickness consisting of a superimposed series of expanded graphite worms that each expand their volume hundreds of times.

The single sheets of graphite remain intact even once they have been separated by the expansion effect and form a close grid that does not burn, does not emit fumes and carbonizes on the surface of the foam, thus forming a layer that prevents the flames from spreading.

Using expandible graphite as a filler is a cheap and very effective method for making a fire-resistant foam, with low smoke entry and with low emission of VOC substances.

Because of these properties, there is today a constantly increasing use of expandible graphite as filler material to reach the correct degree of fire resistance in the flexible foam intended for thermal and acoustic insulation of household appliances and of parts of transport means and for components of interior furnishing.

Expandible graphite is commercially available in the form of sheets or wavers of reduced dimensions and selected with specific screening and with an adequate thickness for forming worms of sufficient length to form the grid during the expanding step; the surface extent dimensions are important for obtaining the characteristics and effects required by the expansion. In order to characterize the type of expandible graphite, and expansion index and an approximate size of the statistical distribution of the plan dimensions of the individual graphites.

As polyurethane is a thermosetting resin generated by chemical reaction by mixing at least two reactive resins, current technology disperses the graphite disperses the graphite in at least one of the two resins and subsequently doses the resins in a stoichiometric ratio within a mixing and dispensing device in which mutual mixing through high turbulence takes place; the obtained mixture is then dispensed into a mould in which, during the reaction, the foam takes shape.

Two mixing methods and corresponding mixing devices comprising mixing heads are possible.

A first type of mixing is carried out by mechanical stirring by impellers. The resins, in this case, are delivered by valves controlled inside a chamber that contains an impeller and are thoroughly mixed through the effect of the turbulence induced by the mechanical action and by the rotation speed of the aforesaid blades. The chamber, which is normally circular, can have smooth walls or be provided with stator blades. In this case, the device is generally indicated as a low pressure mixing head because the reactive components are supplied at low pressure to the delivery valves.

The low pressure mixture by impellers requires the reagent resins to be cleaned from the mixing and dispensing chambers with solvents and/or air jets at the end of each dispensing operation.

A second type of mixing is on the other hand performed by high turbulence (turbulence with very fine swirl) induced by high kinetic energy jets originating from the transformation of pressure energy—generated by the dosing members of the single resins—into kinematic energy of the jets by injectors the nozzles of which inject the resins into a common mixing chamber where they knock into one another or knock against the walls. In this case, the device is generally indicated by the term "high pressure mixing head".

The high pressure mixing enables the reagent resins to be cleaned from the mixing and dispensing chamber with sliding mechanical members at the end of each dispensing operation.

The high pressure mixing devices includes two or more tanks containing the single reactive resins; from them, the resins are taken from respective dosing pumps, for example of the axial or radial piston type, to then be sent, dosed according to a correct stoichiometric ratio, to the corresponding mixing head.

One known high pressure mixing head consists of a body within which a mixing chamber is obtained that is normally of cylindrical shape on which injectors of the resins face one another that are arranged along radial axes separated radially that are orthogonal or tilted to the aforesaid mixing chamber axis. The injectors are supplied with the single resins by delivery conduits through the head body, and transform the pressure energy into kinematic energy of the jets through nozzles the size of which is adjusted by a partializing pin that is axially movable to the nozzle.

The mixing energy for turbulence arises both from the kinetic energy of all the jets that flow into the mixing chamber and from the reciprocal position of the nozzles on which the clash position and direction of the jets depends.

A valve member, which is also known by the term slide-valve, is slidable in the mixing chamber by a hydraulic control piston that moves the valve member to an advanced (closed) a retracted (open position).

On the surface of the slide-valve longitudinal slots are obtained that, in an advanced position, fact the respective injectors to the front and rear of the respective recirculating holes for recirculating the single resin to the corresponding recirculating hole through which the single resin is again sent to its tank.

The high pressure mixing heads can be of linear type, i.e. configured with the mixing chamber arranged coaxially and/or coinciding with the end dispensing conduit, and, in this case, the slide-valve also performs the function of self-cleaning and expelling the mixture residue from the head.

Alternatively, the high pressure mixing heads can be configured as an "L": in this configuration the mixing chamber and the relative slide-valve extend orthogonally to the dispensing conduit and the latter is provided with a further sliding member, which is also assigned to self-cleaning in sequence on the slide-valve, i.e. for the expulsion of reagent resin residues at the end of each mixing and dispensing cycle.

Whilst the low pressure mixing heads have to be washed with a flow of solvent at the end of each mixing and dispensing cycle, in the high pressure heads it is the aforesaid hydraulically driven self-cleaning scraping devices that perform cyclical cleaning, expelling the resin residues at the end of each dispensing session, thus without need for cleaning solvents.

In general, the expandible graphite, during circulation in the circuits, in interaction thereof with the surfaces of conduits and in the traversing of various passage sections, is subjected to various stresses that lead to fracturing of the wavers or blades of the graphite and to erosion and abrasion of the respective edges.

Damage to resin reduces the efficiency thereof in forming a possible mesh that is flame-resistant, the ground graphite that arises therefrom, blackens the resin and the presence of salts an acids that are released by damage to the expandible layers progressively compromises the reactivity of the resin to which the graphite is added and the compound, jeopardizing the optimum expansion of the foam.

Other types of filler material that are dispersed in the reactive resins and perform specific functions that are also different from those of the expandible graphite have the same problem of being easily damageable in the processes of mixing and dispensing analogously with what has just been disclosed in relation to expandible graphite.

One first example of these other materials are the hollow glass microspheres used for giving the loaded polyurethane foam product a certain resistance to pressure. This material is for example used to coat tubes or other products that have to be immersed in water to a slight to medium depth.

Another example of a filler material is that of hollow or compact plastic microspheres; the hollow or compact plastic microspheres are used to make the loaded polyurethane product machinable by machine tools and in particular to produce panels that, glued together, enable models to be made, replacing wood in this function.

Other porous or sheet filler materials like montmorillonite, peelable clay and graphene, are used to increase mechanical properties, the impermeability of foams or also compact polyurethane products.

These further filler materials mentioned above have, like the expandible graphite seen above, the same problems of progressive damage during mixing and dispensing recirculating, with particular reference to the fact that they are easily damageable inside the mixing devices disclosed above and particularly during high-pressure circulation through the injectors.

In the light of what has been set out above, there is thus ample room for improvement for current recirculating, mixing and dispensing systems that use two or more resins to be mixed, at least one of them containing a filler material.

OBJECTS OF THE INVENTION

One object of the present invention is to improve current systems for recirculating, mixing and dispensing with loaded reactive resins.

In particular, one object of the invention is to provide a solution that is able to minimize the risk of damage, during the process of moulding by reaction, with filler materials characterized by fragility because of breakage, breaking up or wear to single particles dispersed inside the resins to be mixed.

More precisely, but in a non-limiting manner, a system is intended to be provided that does not damage the sheets of expandible graphite during discontinuous use in the high-pressure mixing head for producing objects in series.

One object of the invention is thus to provide a solution that enables qualitatively better loaded foams to be obtained.

SUMMARY OF THE INVENTION

The objects stated above are achievable by a method and an apparatus for preparing, recirculating and dispensing a mixture according to what is defined in the attached claims. Owing to the method and apparatus according to the invention, damage to the filler material dispersed in the resins and accumulation of said damage are reduced significantly, that results in higher quality and in better performance of the objects and products obtained by moulding by reaction and in particular by foaming by reaction.

With particular reference to moulding by reaction and to foaming with expandible graphite, wear and erosion is reduced significantly that the latter is subjected to in the high-pressure mixing process in particular minimizing and counteracting the damage that the graphite suffers during the step of high-pressure circulation, during the circulation through the injectors, the slots of the slide-valve, the dosing pumps and conduits in general.

BRIEF DESCRIPTION OF THE DRAWINGS

The method and the apparatus according to the present invention will be disclosed with in greater detail with reference to the attached drawings that shows some embodiments by way of non-limiting implementation, in which:

FIG. 3A' is an enlargement of a portion of FIG. 3A;

FIG. 3B shows an injector device (interception and supply device) included in the apparatus according to the present invention;

FIG. 3C shows a diverter valve device (disconnecting device) included in the apparatus according to the invention;

FIGS. 3D and 3E show a further embodiment of the of the diverter valve device (sectioning device) in two different operating positions;

FIGS. 8A to 8D show different apparatus embodiments, corresponding to different number configurations and arrangement of members for injecting/supplying polymeric components and recirculating inside the mixing head;

FIG. 9 is a graphic of the (non optimized) trend of the pressure to which are subjected a first component (double line) and a second component loaded with filler in a delivery line consisting of stiff pipes and/or flexible pipes of stiff or hardly elasticating type, in function of the operational state of the diverter valve, of the interception-supply device, and of the mixing slide-valve;

DETAILED DESCRIPTION

Figure 1:
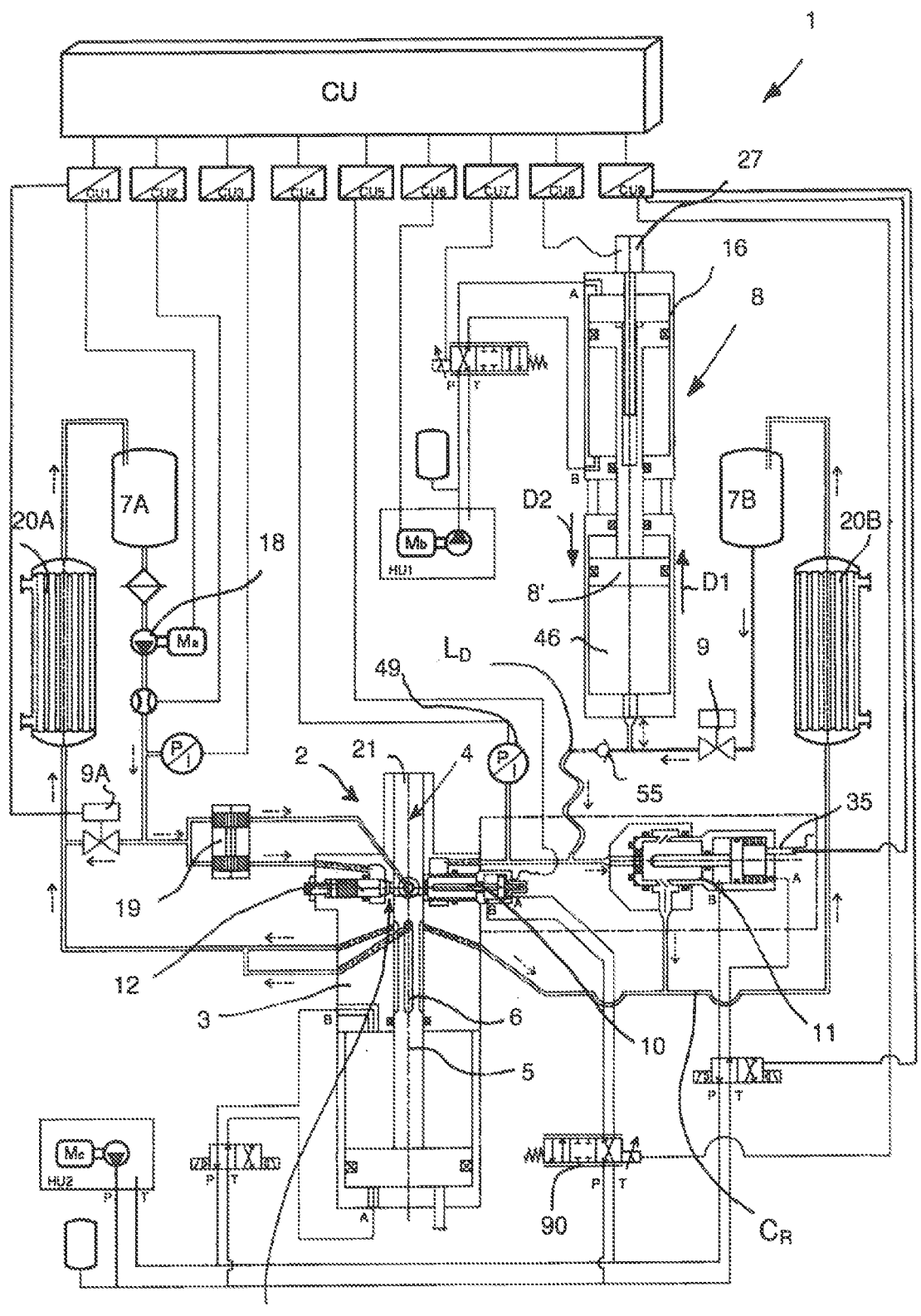
FIG. 1 is a diagram of a first embodiment of the apparatus according to the invention.
Figure 2:
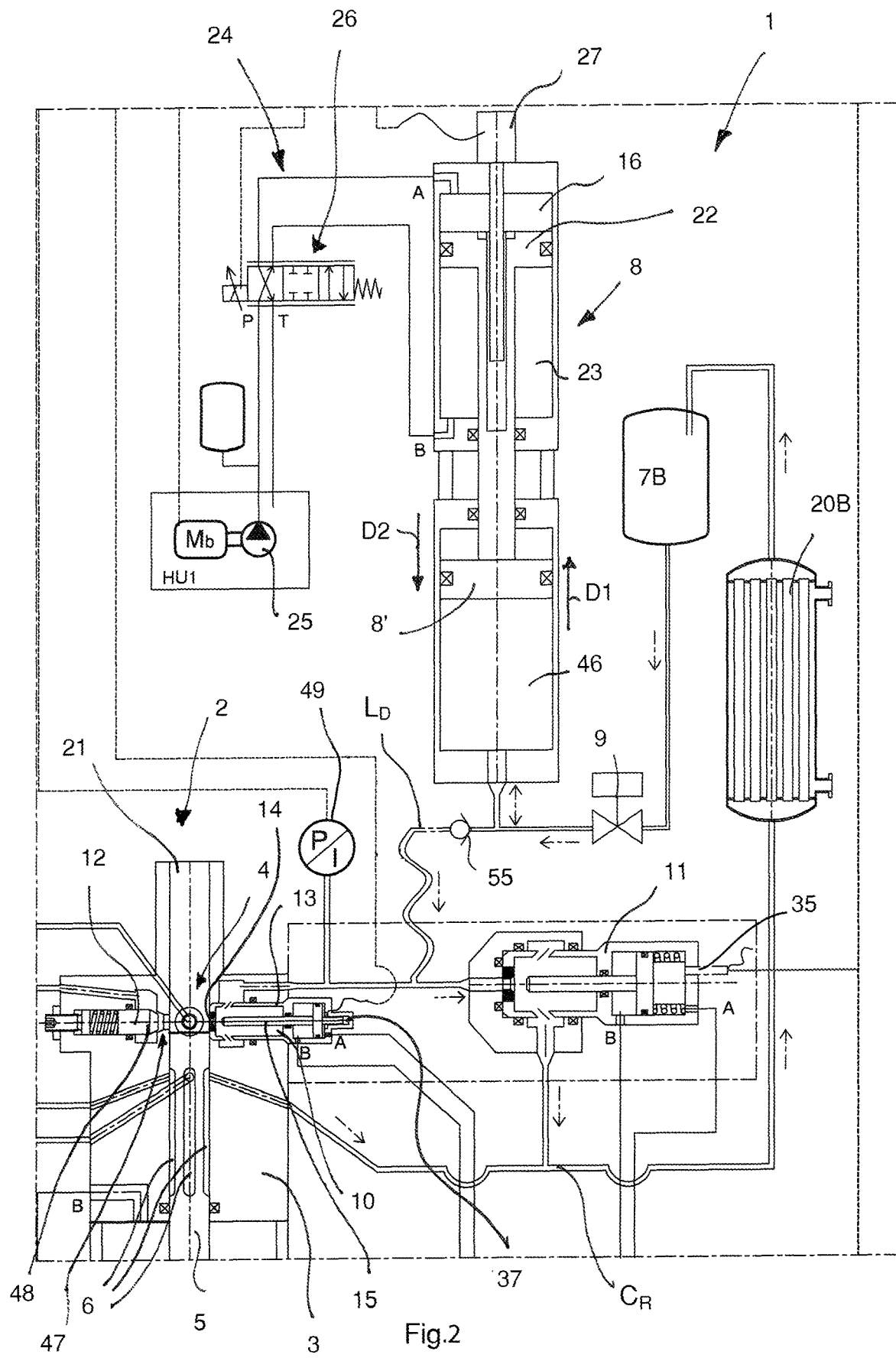
FIG. 2 is an enlarged view of a portion of the apparatus of FIG. 1.
Figure 2A:
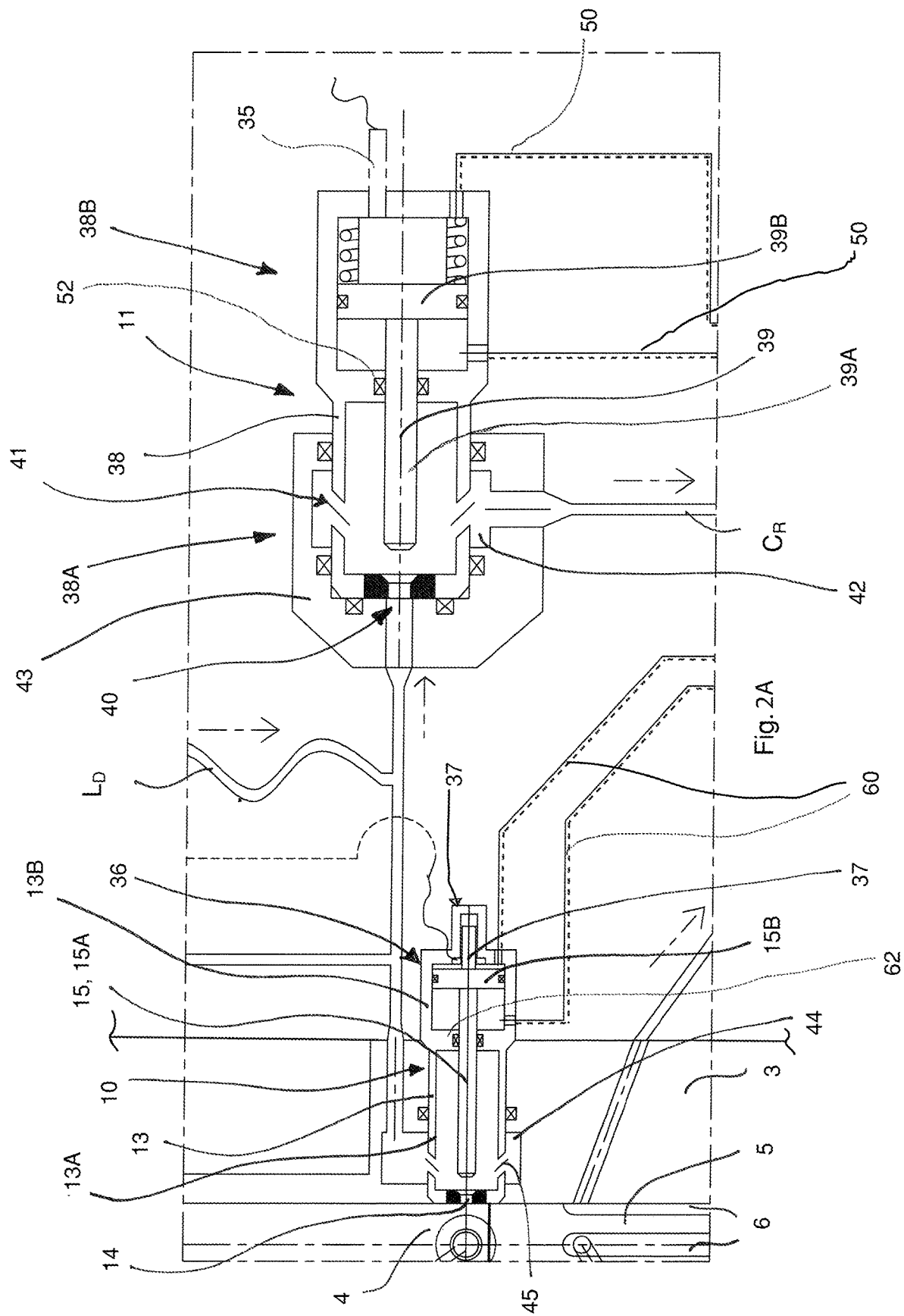
FIG. 2A is a further enlargement of a portion of FIG. 1, in which are visible part of a section of mixing head, and a part of fluid circuit that comprises an interception and supply injecting device for a loaded component, and an intercepting and diverter valve for diverting the flow of the latter component to a recirculating circuit, precisely return to the tank.

With reference to FIGS. 1, 2, 2A, a first embodiment of an apparatus 1 according to the invention is disclosed, configured to prepare and dispense a reactive mixture to form by reaction objects or products, this mixture being obtained from the high pressure mixing of at least a first chemically reactive component A with at least a second B chemically reactive component containing a filler material.

In particular, the filler material to which non-restrictive reference is made below, is graphite of expandable type, in flakes or sheets, used to provide the polymeric mixture with a flame-proof or flame-retardant property.

Nevertheless, the apparatus 1 and the method according to the invention lend themselves to be used successfully also with the adoption of hollow glass microspheres, hollow or compact plastic microspheres, montmorillonite, peelable clay, graphene and other fillers characterized by fragility because of breakage, breaking up or wear to single particles.

The apparatus 1 comprises a high pressure mixing device 2 and a command and control unit CU assigned to monitoring, driving and controlling various parts included in the apparatus 1.

The control unit CU, in particular, comprises a PLC or other type of programmable control unit.

The operating control and detection connections relating to the control unit CU for the various parts of the apparatus 1 are indicated by the references CU1, CU2 ... CUn, shown in FIGS. 1 and 3.

For the sake of simplicity, below, to indicate that each single component of the apparatus 1 is operationally connected to the command and control unit, for the latter, in general, the reference CU will be used in general.

The mixing device 2 is provided with a mixing head 3 in which a chamber 4 is obtained to mix the components A and B.

The first reactive polymeric component A is removed from a respective tank 7A, by one of more pumps 18, 18', driven by one or more respective motors $M_a$, the operation of which is adjusted by the control unit CU.

The dosage of the component B is controlled and synchronized by specific sections (for example CU4, CU6, CU7, CU8) being part of the command and control unit CU. The control of the dosage is adjusted in a closed loop detecting the flowrate values by a flowrate transducer for example of volumetric or mass type.

Likewise the dosage of the component A is controlled and synchronized by specific control lines.

The polymeric component A, in particular, comprises isocyanate or a hardener, whereas the polymeric component B is a polyol or a resin that polymerizes if mixed with the hardener (such as for example of polyester or epoxy type) containing dispersed internally the filler, for example expandable graphite.

The jet of polyol B with graphite (or another filler) can have an apparent viscosity that is much higher than the other component A of the mixture: this increased apparent viscosity is due to the presence of a certain quantity of dispersed filler that is necessary to obtain the desired features. For this reason, the jet of this component is characterized by a much reduced jet Reynolds number, thus resulting in a jet less turbulent and difficult to disperse before of less turbulence in the other reactive component.

For this reason, in one embodiment, it is preferred to increase mixing efficiency by increasing the energy and specific mixing turbulence in the mixing volume. To achieve this aim, one proceeds, for example, by dividing the flowrate of the isocyanate or of the hardener into two jets, so as to provide the same flowrate net of the efficiency of the specific pump, and of the load losses downstream of each element of the divider at the two injectors.

This is achieved by a flow divider 19 of the mechanical type.

For example, a mixing chamber 4 is used in which three injection points face one another, one for the polyol B with graphite and another two for the isocyanate divided equally by a flow dividing device. In this manner, mixing efficiency is increased, because, in a single jet, part of the turbulence is not used because the single component of the jet is remixed in zones of the mixing chamber 4 where it is not yet combined with the component B.

In a first embodiment of an apparatus 1 (shown in FIG. 1), there is a removal circuit for removing the polymeric component A having a single dosing pump 18 and there is the aforesaid flow divider 19 that divides into two the flow so as to supply two respective injectors 12 coupled with the mixing head 3.

The flow divider 19, in one possible embodiment, can consist of components made with coupled gear or other types of stiffly coupled flow dispensers.

According to another embodiment, the configuration has a single injector 12 for the first polymeric component A, thus a single dosing pump 18 and no flow divider 19.

Figure 3:
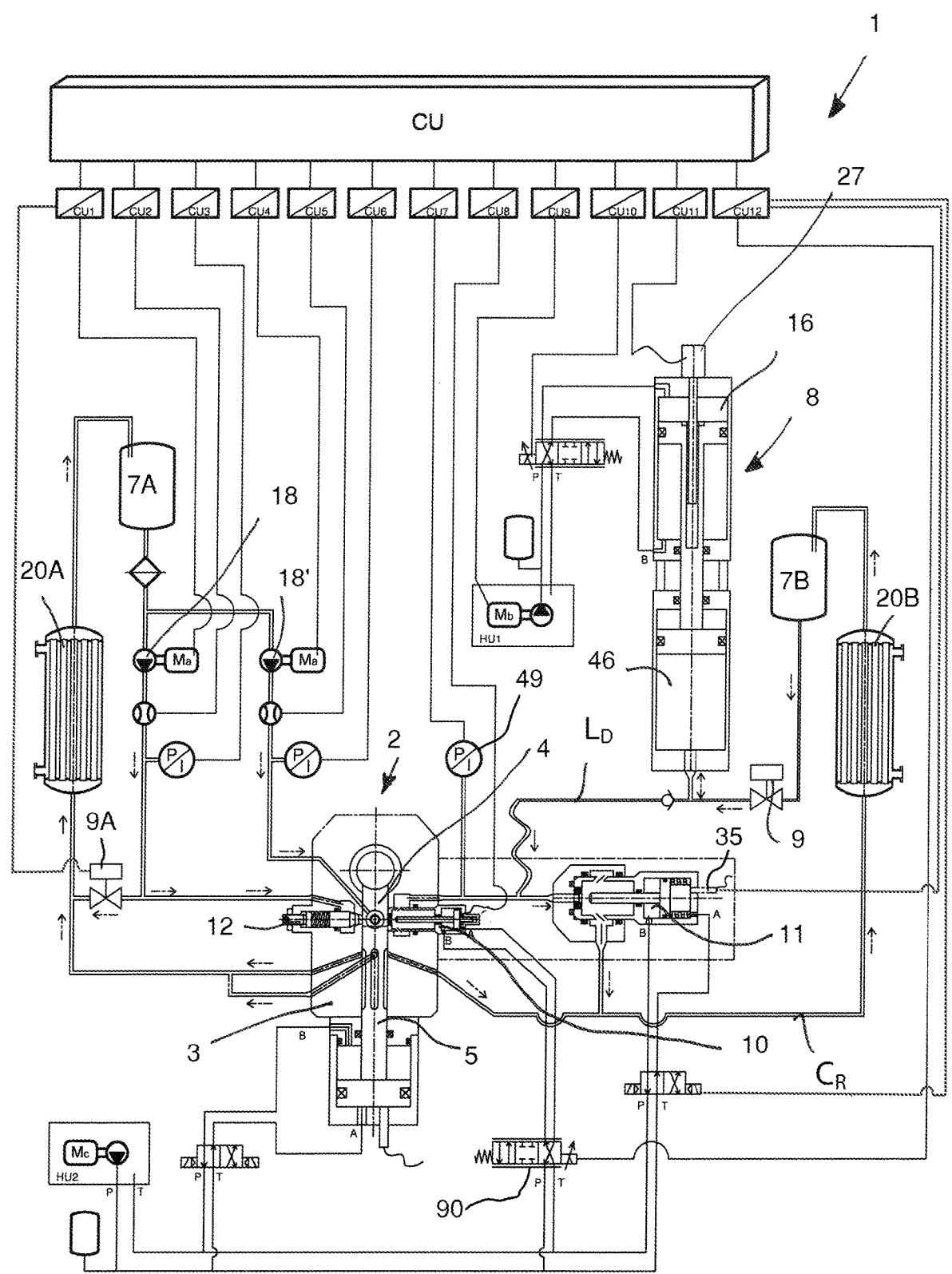
FIG. 3 is a diagram of a second embodiment of the apparatus according to the invention.

According to a further embodiment, shown in FIG. 3, the apparatus 1 comprises two distinct dosing pumps 18 and 18' each arranged for supplying, by a dedicated delivery line, a respective injector 12. In this case, the two pumps can provide different flowrates and pressures that enable the division of the kinetic energy in the impingement function provided by the two jets to be optimized.

The pump/s 18, 18' is/are controlled by the control unit CU.

The apparatus 1 comprises a pumping and dosing arrangement 8 configured to remove, from the respective tank 7B, a certain quantity of the at least second chemically reactive component B containing the filler material to be sent to a delivery line $L_D$.

The line consists of stiff or hardly elasticating conduits, which dimensions are such as not to exceed the speed of 8 mt/sec and of a flexible pipe sized so as not to exceed a speed equal to 12 mt/sec for the flow of the polymeric component.

The tank 7B is of the pressurizable type and is provided with a liner supplied with thermostating liquid to maintain the second polymeric component B at an optimum temperature for the process. Inside the tank 7B, a mobile impeller is mounted controlled by a reduction gear for example of scraping blade type that is suitable for maintaining the second polymeric component B and the solid particles of the filler mutually amalgamated uniformly and sedimenting the solid particles on the bottom of the tank 7B.

In greater detail, the pumping arrangement 8 comprises a dosing and pumping cylinder that includes a piston 8' movable in a first direction D1 to fill the chamber 46 of the cylinder 8 by removing the second component B from the respective tank 7B. The piston 8' is further movable in a second direction D2 (opposite with respect to the first direction D1), to pressurize the second component B present in the delivery line $L_D$ and send the second component B, suitably dosed, to the recirculating or mixing device, after suction is closed by the valve 9.

The dosing and pumping cylinder comprises surfaces that are hardened and/or coated with chromium within which the aforesaid scraping piston 8' runs.

The piston 8' is connected to and is drivable by, a hydraulic control member 16, 22 as shown better in FIG. 2.

In particular, the hydraulic control member 16 comprises a rod/piston 22 movable inside a cylinder chamber 23 that is supplied, at two opposite ends, by a hydraulic circuit 24. The hydraulic circuit 24 includes a servo valve 26 and is connected to a hydraulic unit HU1 provided with a pump 25 driven by a motor Mb, and operationally connected to the control unit CU.

The hydraulic control member 16 is provided with position transducer 27 of the rod 22, operationally connected to the control unit CU, that detects the position of the rod 22 and thus of the dosing and pumping piston 8' of the second polymeric component B to which it is stiffly connected. Likewise, on the delivery line $L_D$ a pressure transducer 49 is installed that detects and transmits to the unit CU the pressure of the component B in the delivery line to the recirculating and mixing device.

For the control member 16, there is thus a closed loop feedback control that, with the help of the position transducer 27 and suitably driving the servovalve 26, commands and controls continuously the position and the speed of the dosing and pumping piston 8' as well as the pressure that it induces on the component B along the delivery line $L_D$.

Figure 4:
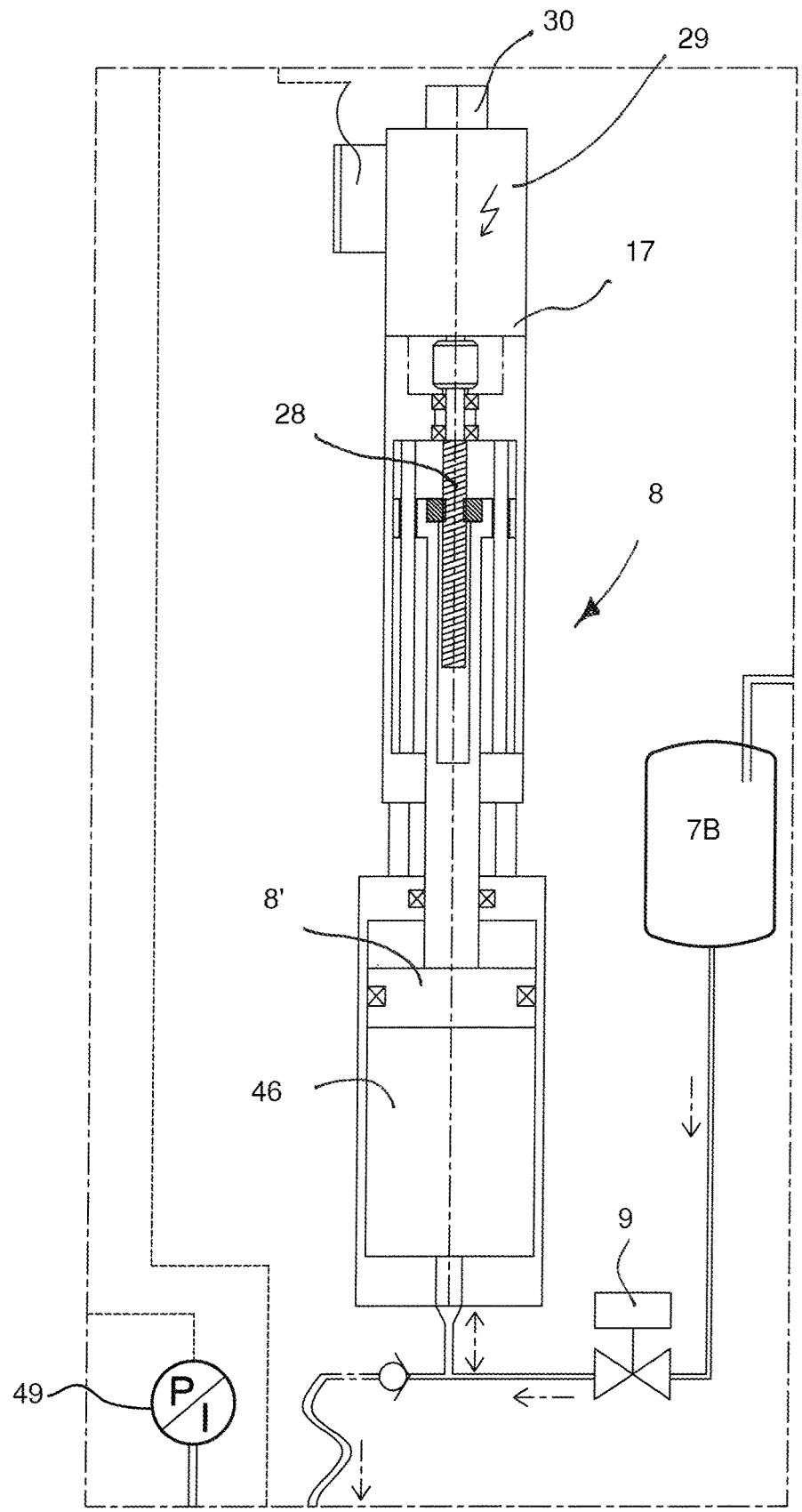
FIG. 4 shows in detail a dosing and pumping arrangement for the at least second polymeric component containing the filler, having a different drive mechanism embodiment.

In another embodiment of the apparatus 1, with reference to FIG. 4, the piston 8' of the dosing and pumping cylinder is driven by an electrically controlled member 17.

The electric member 17 comprises a mechanism 28 with the control screw and corresponding ball screw (or roller screw) moved by an electric motor 29 and corresponding reduction gear or other transmission member. In this configuration, the position and speed of the piston 8' of the dosage cylinder are controlled by the closed loop with feedback unit CU with the help of a rotary transducer 30 installed on the electric motor 29 or with the help of a transducer of linear type installed parallel to the control screw to detect translation thereof.

Normally, the flowrate of the polymeric component B is controlled indirectly by measuring the movement of the piston 8' and thus detecting the reduction of the volume of the component B in the chamber 46 during the stroke of the latter in the corresponding cylinder; alternatively, it is possible to install and measure the flowrate directly by a mass flowrate transducer along the delivery line $L_D$ to the recirculating and mixing head 3.

The apparatus 1 comprises a sectioning valve 9 controlled by the automatic cycle to interrupt the fluid communication between the dosing and pumping cylinder 8 and the tank 7B of the second polymeric B component when the chamber 46 of the cylinder is sufficiently filled to control motion reversal.

The on-off valve can consist of a normal commercial valve or, as shown in greater detail in FIG. 7, the sectioning valve 9 can have the same configuration as the diverter valve 11 disclosed below.

The apparatus 1 comprises a re-introduction circuit $C_R$ configured to re-deliver the loaded second polymeric component B, low pressure recirculating conditions to the respective tank 7B not passing through the slide-valve 5 of the mixing head 3. For this purpose, a diverter valve 11 is provided that is positioned directly on the body of the head 3 or placed in a separate position immediately upstream thereof near the mixing head 3 along the flow delivery line $L_D$ from the cylinder 8 to the mixing head 3. The diverter valve 11 is configured to divert the circulation of the second component B from the delivery line $L_D$ to the re-introduction circuit $C_R$.

The diverter valve 11, of the two-way type, when it is open, discharges the flowrate coming from the delivery line $L_D$ to the return circuit to the tank 7B and permits low pressure circulation of the flowrate of the loaded component. The diverter valve 11 can be controlled pneumatically electrically or hydraulically.

The diverter valve 11, owing to the specific structural and functional configuration, is fast and reliable, compact and can thus be applied to the mixing head 3 or be installed next to the mixing head 3.

The diverter valve 11 can also be configured as a three-way valve so as to perform the following functions: the function of closing the flow to the interception and supply device 10, the function of opening to the re-introduction circuit $C_R$ to the tank 7B, the function of closing to the re-introduction circuit $C_R$ and opening to the interception and supply device 10 to the mixing head 3.

Also the dosage circuit of the reactive component A is provided with a recirculating or re-introduction valve 9A to the tank 7A for low pressure recirculation for energy-saving or thermal conditioning reasons.

The apparatus further comprises pipe bundle heat exchangers 20A, 20B through which the respective polymeric components A, B are made to flow before being re-introduced into the respective storage tanks 7A, 7B, to be subjected to a thermal conditioning step.

Figure 7:
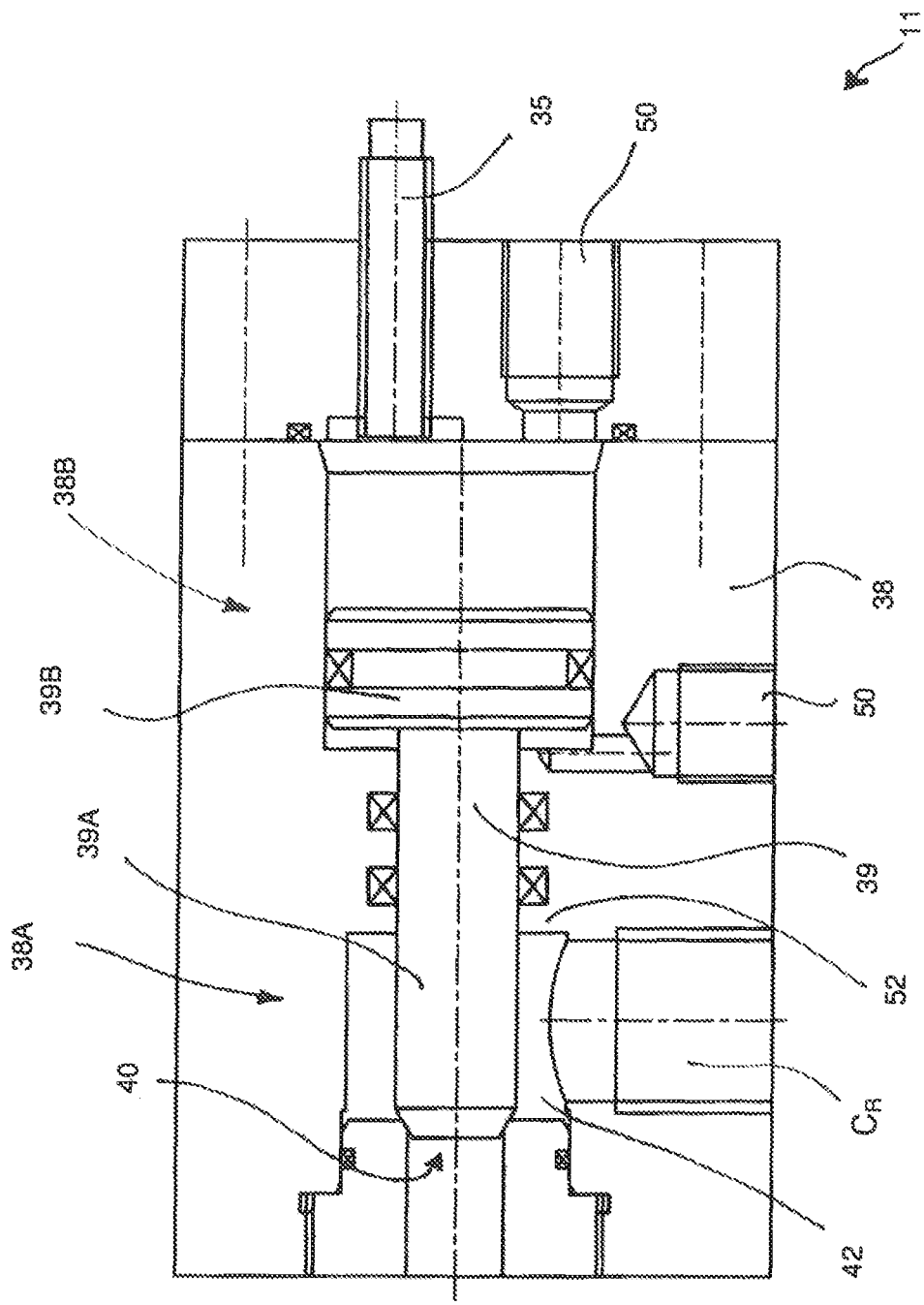
FIG. 7 shows an intercepting and diverter valve device of the fluid circuit of the apparatus provided with an opening check sensor.

As shown schematically in FIG. 2A, and more visible in FIG. 7, the diverter valve 11 comprises a hollow valve body 38, consisting of two parts: an operating part 38A and a drive part 38B, having respective mutually separate cavities. The operating part 38A is highly resistant to abrasion. Inside the valve body 38, a shutter element 39 is movable, driven hydraulically, arranged for enabling/preventing the passage of the second polymeric component B containing the filler coming from the tank 7B to the re-introduction circuit Cr to the tank.

A position sensor 35 is provided that is operationally connected to the control unit CU, that detects the position of the shutter piston 34 and thus the opened or closed operating status of the diverter or bypass valve 11.

When the diverter valve 11 is applied directly to the body of the head, the cartridge part to be inserted into the respective housing is represented in FIG. 2A as a cartridge element 43 that acts as a connection to the delivery line $L_D$.

In the body part 38A a inlet opening 40 is obtained that is suitable for receiving the second polymeric component B flowing along the delivery line $L_D$ and the radial outlet openings 41 that are suitable for enabling the second component B to flow inside an annular conveying chamber 42 defined in the cartridge element 43.

The annular conveying chamber 42 has the function of conveying the flow of the second component B to the re-introduction circuit $C_R$.

The aforesaid shutter element 39 included in the diverter valve 11 has an oblong (plug-shaped) operating portion 39A, shaped to close and open completely the inlet opening 40 which dimension is such as to avoid partializing the flow of the second component B, and a drive portion 39B that—by a hydraulic or pneumatic drive circuit 50—is suitable for moving the shutter element 39 forwards and backwards.

Also the shutter element 39 similarly to the operating part 38A, consists of compounds or alloys that are highly resistant to abrasion.

This valve 11 consists of the closing part, for example of a plug and nozzle 40 made of abrasion-resistant material and the inlet opening 40 is sized with passage sections so as to maintain a load loss and a reduced speed and avoid fracturing/damage/wear to the graphite.

Appropriate experimental trials have established that in order to avoid damage to the expandable graphite, the inlet opening 40 has to be dimensioned so as to maintain the average crossing speed below 12 mt/sec.; in this context, a test was for example conducted at a flowrate equal to 225 g/sec and a dimension of the inlet opening 40 equal to 8 mm and average flow speed equal to 4.5 mt/sec.

In particular, the inlet opening 40 has a section (area) equal to or greater than at least twice the section (area) of the supply nozzle 14.

The oblong operating portion 39A is slidable through a transverse wall 52 (or bush element) that guides the oblong operating portion 39A appropriately in a sealed manner, maintaining the oblong operating portion 39A in a correct position.

As already said, the position sensor 35 can be coupled with the diverter valve 11, the position sensor 35 being operationally connected to the control unit CU to monitor constantly in real time the precise position of the shutter element 39.

Along the delivery circuit, a pressure relief valve is installed, which is not shown, that, if necessary, induces the resin to recirculate along the re-introduction circuit $C_R$.

The apparatus 1 comprises, downstream along delivery line $L_D$, branching off from the re-introduction line Cr, an interception and supply device 10 configured to permit/prevent the supply of the second component B to which filler is added to recirculation in the mixing slide-valve 5 of the head 3 of the mixing device 2. As will emerge below, the geometric and functional configuration of the interception and supply device 10 is such as to reduce as much as possible damage to the filler contained in the second polymeric component B until it is zeroed for circulation within the mixing slide-valve.

As shown better in FIG. 2A, the interception and supply device 10 is made as cartridge element to be able to be applied to the seat thereof obtained in the head body or in a block lodged near the head body; but nothing prevents the seat being obtained directly in the head body. The cartridge configuration comprises hollow body 13 on which a supply nozzle 14 is obtained and inside which a plug-shaped shutter element 15 is housed and reciprocally movable having a greater diameter than the supply nozzle 14.

The shutter element 15, by way of non-limiting example, is movable inside the hollow body 13 by a hydraulic drive part 36, appropriately controlled by the control unit CU, by a hydraulic valve that, in one basic embodiment, opens or closes the shutter element 15 completely.

The hollow body 13 consists of a first operating part 13A and of a second drive part 13B, having respective mutually separate cavities.

To the first operating part 13A, an annular distributor 44 is applied externally that receives the second polymeric component B coming from the delivery line $L_D$ to deliver the second polymeric component B to the cavity inside the first operating part 13A, from which the second polymeric component B can subsequently traverse the supply nozzle 14 and access the mixing chamber 4.

The passage of the least second polymeric component B from the annular distributor 44 to the cavity of the first operating part 13A occurs through suitable radial openings 45 made in the wall of the first operating part 13A itself.

The shutter element 15 comprises an oblong operating portion 15A, conformed to shape and open completely the nozzle 14, and a drive portion 15B that by—a hydraulic or pneumatic circuit 60—is suitable for moving the shutter element 15 forwards and backwards.

The oblong operating portion 15A is slidable through a transverse wall 62 that guides the oblong operating portion 39A appropriately in a sealed manner, maintaining the oblong operating portion 39A in a correct position.

As shown in FIGS. 1, 2, 2A, 3, 5, the cartridge interception device 10, defines the injector that delivers the component B directly to the mixing chamber 4 of the high pressure head 3.

In this case, the supply nozzle 14 has a passage section calibrated to obtain the pressure requested for mixing at the suitable flowrate conditions. In particular, the minimum dimension of the nozzle 14 must not be less than the maximum dimension of the single wafer of graphite, so that the passage of all the graphite to the mixing chamber 4 is not hindered.

In particular, the nozzle 14 has a diameter equal to at least one and a half times the maximum dimension of the graphite sheets documented by the supplier or detected by a differential sieving operation.

Owing to the specific configuration, the interception and supply device 10 operates differently with respect to a common injector.

In order to highlight better the technical effects associated with the particular structural and functional configuration of the interception and supply device 10 according to the invention, certain concepts are set out concisely below by also comparing together different configurations of injection devices.

Figure 3A:
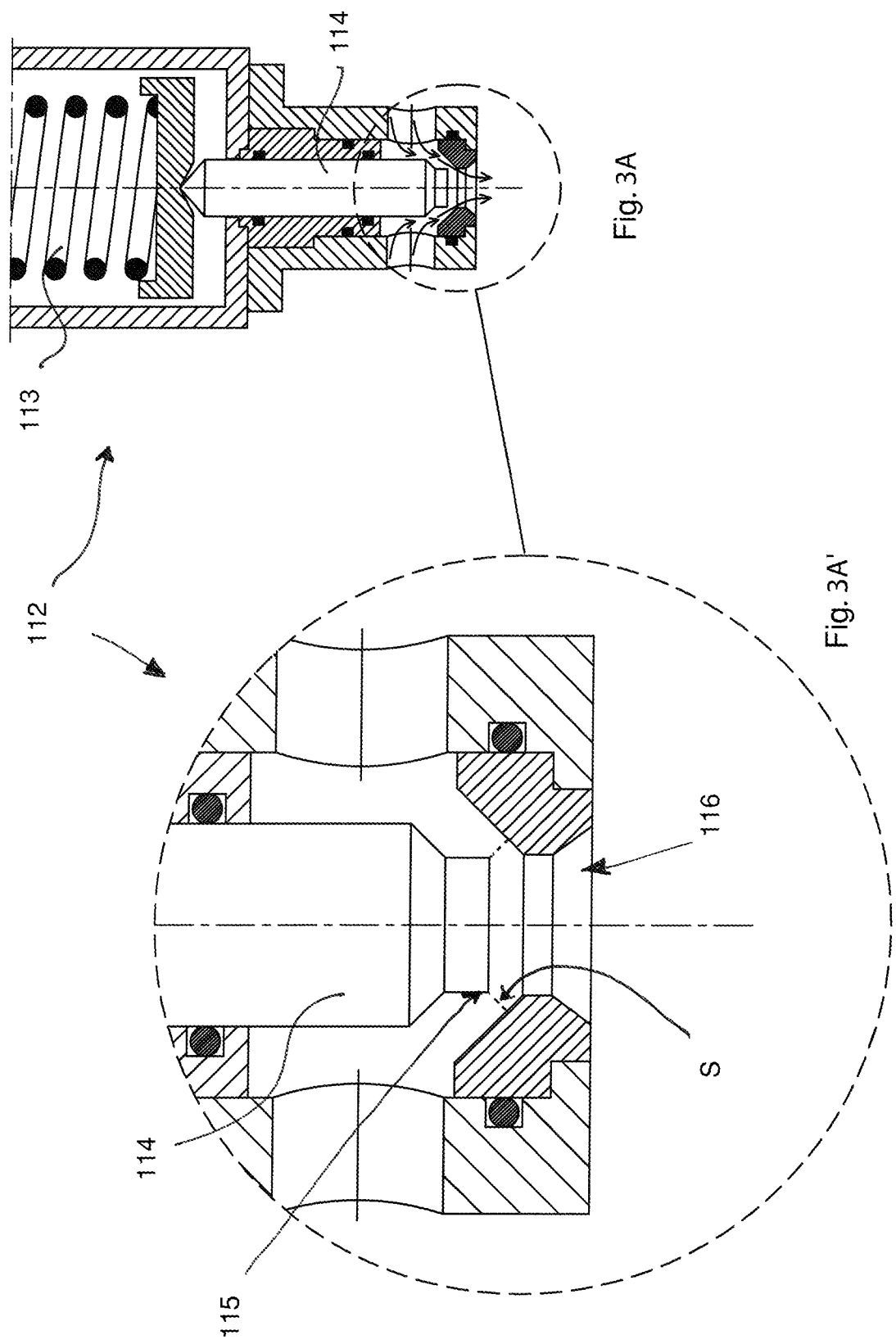
FIG. 3A shows an injector that is normally used to inject a chemical component.

In FIGS. 3A and 3A' a normal injector 112 is shown (for example of the type used to deliver of the component A to the mixing chamber 4). In FIG. 3A, the control spring 113 is visible that enables the start of opening of the corresponding nozzle 116 only when the resulting axis of the delivery pressure determined by the passage through the narrowed section that the fluid component exerts on the pin/plug 114 exceeds the preload force of the spring 113.

The degree of opening of the injector 112 that occurs upstream of the nozzle 116 is determined in the position of equilibrium between the pressure of the fluid and force opposed by the spring 113. In this position of equilibrium a narrow passage section S is defined (shown by a dashed line in FIG. 3A') of frustoconical shape, along the pressure jump follows the law of passage in a thin wall (a hole in a thin wall is a nozzle in which the length of the hole is less than the diameter D thereof, less than 0.7×D).

The narrow passage section S is thus defined between the tip (corner of the cylindrical end) 115 of the pin/plug 114 and the hole 116 (nozzle) with which it is coupled. The pin/plug can adopt variable axial positions depending on the balance between the pressure and spring force or on a manual presetting of the pin/plug 114.

The pressure decreases with the increase of the passage according to the following relation:

$$\Delta P = \eta \frac{1}{2} \rho V_m^2$$

from which is extrapolated:

$$\Delta P = \eta \, 1/2 \rho \frac{Q^2}{s^2}$$

Where:
$\eta$ is a constant
$V_m$ is the average of the speed through the narrow section
Q=flowrate of the fluid (m³/sec)
$\rho$=density of the fluid (Kg/m³)
S=passage section (m²)

Accordingly, an increase of the section is followed by a decrease of the pressure jump with a quadratic law. The position of the needle 114 relating to the nozzle has to be set or it is set according to the preload of the spring so as to determine the narrow section S along said frustoconical restriction defined between the tip 115 of the pin/plug 114 and the hole 116, as visible in FIG. 3A'.

As $V_m=Q/S$, in normal injectors, a phenomenon is produced of great wear of the graphite or other filler in the traversing of the aforesaid narrow passage annular section S characterized by two very near circular corners.

FIG. 3B shows on the other hand the injector device (interception and supply device 10) included in the apparatus 1 according to the present invention. This device 10, in addition to operating as an injector, also acts as a sectioning device, which is able to work controlled in a completely closed or completely open base configuration by a single hydraulic valve. This configuration is the configuration that fully preserves the features of the graphite, thus avoiding an annular narrowing of the passage (as on the other hand occurs in the injector of FIG. 3A, 3A' owing to near circular corners between pin/plug and nozzle) and on the other hand defining a calibrated passage section without the central narrowing element on the open circular nozzle that is sufficient to generate the appropriate pressure jump. In particular, the hole of the calibrated nozzle 14 has to assure a pressure jump (at least above 70 bar) to the operating flowrate of the loaded component B.

The nozzle 14 comprises a hole in a thin wall and the passage section is whole and not choked. The shutter element 15 is incomplete, opens completely at a distance that does not check access to the hole and couples with the nozzle 14 only to achieve total interruption of the flow.

The diameter of the nozzle, in particular, is at least 40% greater than the greater dimension of the sheets or flakes of expandible graphite, and at least double the average dimension of the graphite granules.

The configuration disclosed above of the interception and supply device 10 is the configuration that least damages the graphite, significantly reducing the hydrodynamic shearing stress to which the graphite is subjected.

FIG. 3C shows on the other hand the proper disconnecting device, i.e. the closing/diverter valve 11 included in the apparatus 1 of the present invention. This device is configured to operate in completely open or completely closed configuration, providing a passage section for the loaded component B that is very wide and a closed surface with male cone on female cone coupling.

FIGS. 3D and 3E show on the other hand a further embodiment of the proper disconnecting device, i.e. the closing/diverter valve 11 moving axially in two different operating positions, i.e. open and closed respectively. In this embodiment, the shutter element 39, rather than blocking the flow by coupling with the nozzle (inlet opening 40 or outlet opening 40, depending on the operating condition of the valve 11), acts to interrupt the flow towards the inlet or outlet holes (radial openings 41) of the loaded component B to the recirculating circuit.

Owing to the configuration disclosed above for the interception and supply device 10 and for the diverter valve 11, the shape of the narrow section of both and the wide passage section for the valve 11, the risk of damage to the graphite is reduced significantly, it is thus prevented that the powder of expandible graphite resulting from such damage releases (into the tank 7A) acidity and compromises the reactivity of the chemical components A and B.

In substance, owing to the specific structural and functional configuration of the apparatus 1, and in particular the interception and supply devices intended to be traversed by the loaded component B, the accumulation of crumbled and pulverized graphite inside the re-introduction circuit (recirculating) (disclosed below) and of the tank of the loaded component is considerably reduced.

In normal operating conditions, the shutter element 15, having a diameter that is distinctly greater than the calibrated nozzle 14, is commanded to advance and close completely the latter, or to retract and open completely the calibrated supply nozzle 14 without any choking of the passage section of the flow. In this manner, the filler contained in the at least second polymeric component B, when traversing the zone interposed between nozzle 14 and the front end of the shutter element 15, is not subjected to great rubbing stress with the walls and rubbing between the particles and thus to great wear or damage.

The shutter element 15 is movable, inside the hollow body 13, by a drive unit 36 (that by way of non-limiting example is hydraulic), is appropriately controlled by the control unit CU.

Alternatively, for the shutter element 15 a drive mechanism of pneumatic type can be provided. In each case, the shutter element 15 is driven to open or close the nozzle 14 in very short times, indicatively less than 0.3 seconds.

With the interception and supply device 10, in a more sophisticated embodiment of the apparatus, a position sensor or transducer 37 can be coupled, which is operationally connected to the control unit CU, and by means of which the position is monitored continuously of the shutter element 15 which can also be controlled in position in closed loop by the transducer 37 and a hydraulically controlled servovalve 90 replacing the basic hydraulic valve.

The mixing device 2 is provided with an intercepting and recirculating valve device for intercepting and recirculating the polymeric components called mixing slide-valve 5, or slide-valve.

The slide-valve 5 is controlled hydraulically to advance and retract very rapidly (less than 0.3 sec). The slide-valve 5 slides in a circular section conduit that corresponds to the aforesaid mixing chamber 4. On the mixing chamber, the nozzles 47 of the injectors 12 face one another in radial positions that deliver the component A and the supply nozzle 14 (of the interception and supply device 10) for the at least one component B.

The nozzles referred to above have a section that is such as to transform the pressure energy into kinematic energy of the jets of the components that by hitting one another in the mixing chamber 4 and hitting the walls of the chamber 4, produce the turbulence that is necessary to mix thoroughly the reactive components. The mixing slide-valve 5 is provided with longitudinal recirculating slots 6 that face one another opposite the single injectors when the slide-valve 5 is in an advanced position, these longitudinal recirculating slots 6 having the purpose of conveying the components exiting the injectors backwards to conduits obtained in the head body at the slots 6. These conduits recirculate the respective components A and B to the respective tanks 7A, 7B maintaining the components A and B separate.

Figure 6:
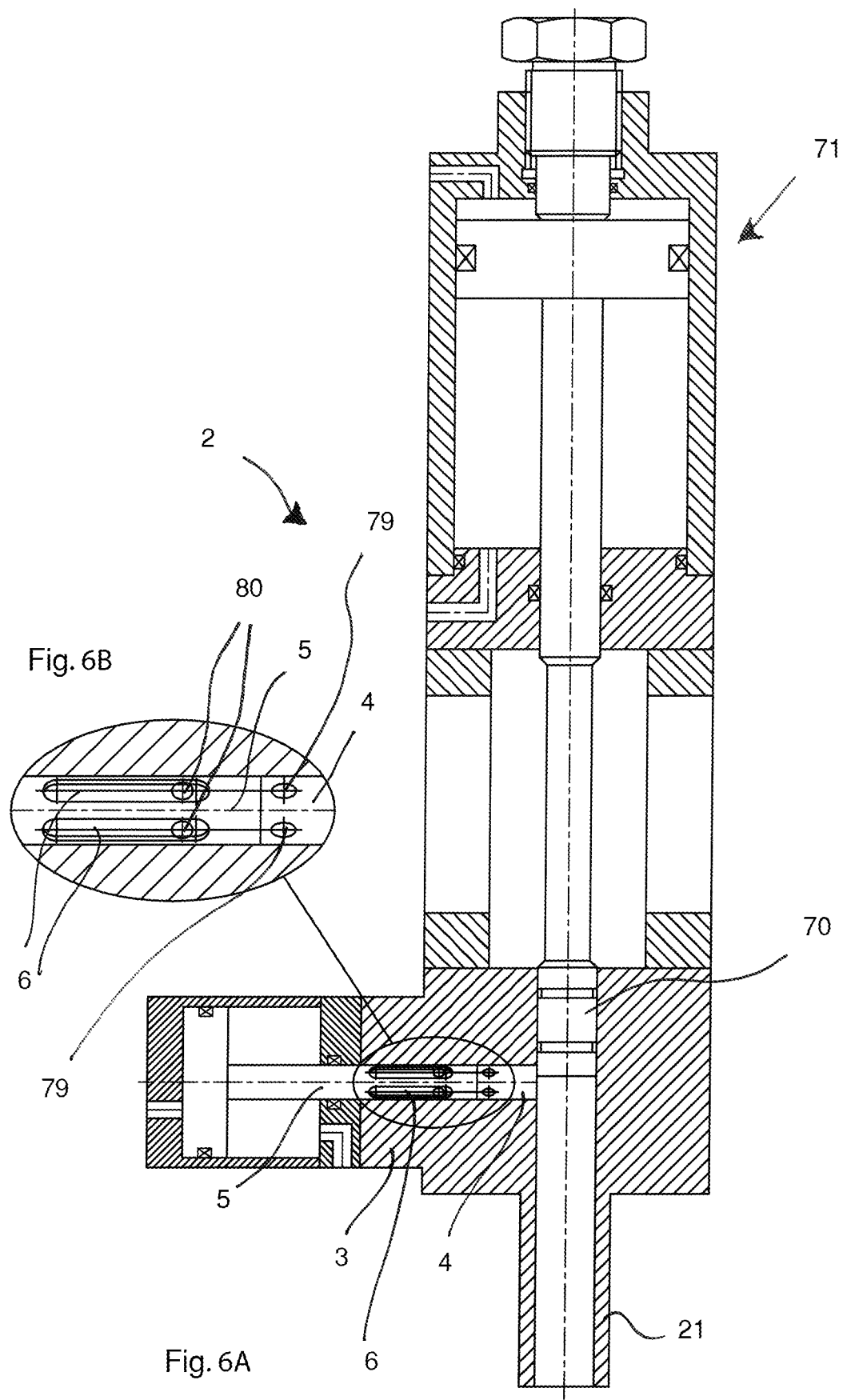
FIG. 6A shows in detail in section parts of a mixing device in which are visible a mixing head, a slide-valve and a cleaning member that is slidable along a conduit for dispensing the mixture.
FIG. 6B is an enlarged detail that shows part of the slide-valve which longitudinal slots are clearly visible for recirculating the polymeric components and the injection holes in the mixing chamber.

Various configurations/arrangements are possible of the injectors and of the interception and supply device 10 with respect to the mixing head 3. The injectors 12 and the interception and supply device 10 introduce the polymeric components into the mixing chamber 4 through respective inlet (injection) openings 79, obtained in the head 3 (FIG. 6B).

According to a first possible embodiment schematized in FIG. 8A, there are two injectors 12 placed mutually diametrically opposite to inject the first polymeric component A, whereas the interception and supply device 10 for the second polymeric component B is arranged in a position that is angularly equidistant from the aforesaid two injectors 12.

In a second possible embodiment, schematized in FIG. 8B, a first injector is provided 12 placed diametrically opposite the interception and supply device 10 and a second injector 12 interposed in a position angularly equidistant from the first injector 12 and from the interception and supply device 10.

In a third possible embodiment, schematized in FIG. 8C, only one injector 12 is provided for the injection of the first polymeric component A, positioned diametrically opposite with respect to the interception and supply device 10 dedicated to the second polymeric component B containing the filler material.

In a fourth possible embodiment, schematized in FIG. 8D, two injectors 12 are provided for the first polymeric component A; the two injectors 12 and the interception and supply device 10 are arranged mutually equidistant angularly, i.e. they are placed angularly at 120 degrees from one another.

As already disclosed, a slide-valve 5 is housed and slidably movable in the head 3, along which slide-valve 5 longitudinal slots 6 are obtained that are suitable for recirculating the components A, B to the respective storage tanks 7A, 7B, through suitable recirculating openings 80 obtained in the head 3.

The slots 6 can be suitably sized to avoid damage to the graphite contained in one of the polymeric components. Precisely, the slots 6 are sized to prevent the polymeric component loaded with graphite to exceed 30 mt/sec for average recirculating speed. For example, the longitudinal slot 6 can have dimensions equal to 3.5×3.5-12.25 mm$^2$. With these dimensions, a traversing speed of the slot equal to 20 mt/sec corresponds to a circulating flowrate of 225 g/sec.

As will be shown below, it has been discovered, from thorough and laborious experimental tests that also the advancement speed of the resins along the conduits and passages has to meet certain conditions to avoid any risk of damage to the expandible graphite.

The mixing device 2 comprises a dispensing conduit 21 for the resulting mixture.

In this first embodiment of an apparatus 1, the head 3 is of linear or straight type, i.e. has the dispensing conduit 21 arranged coaxially with respect to the mixing chamber 4. In other words, the dispensing conduit 21 is aligned on the mixing chamber 4, being almost a continuation thereof.

Figure 5:
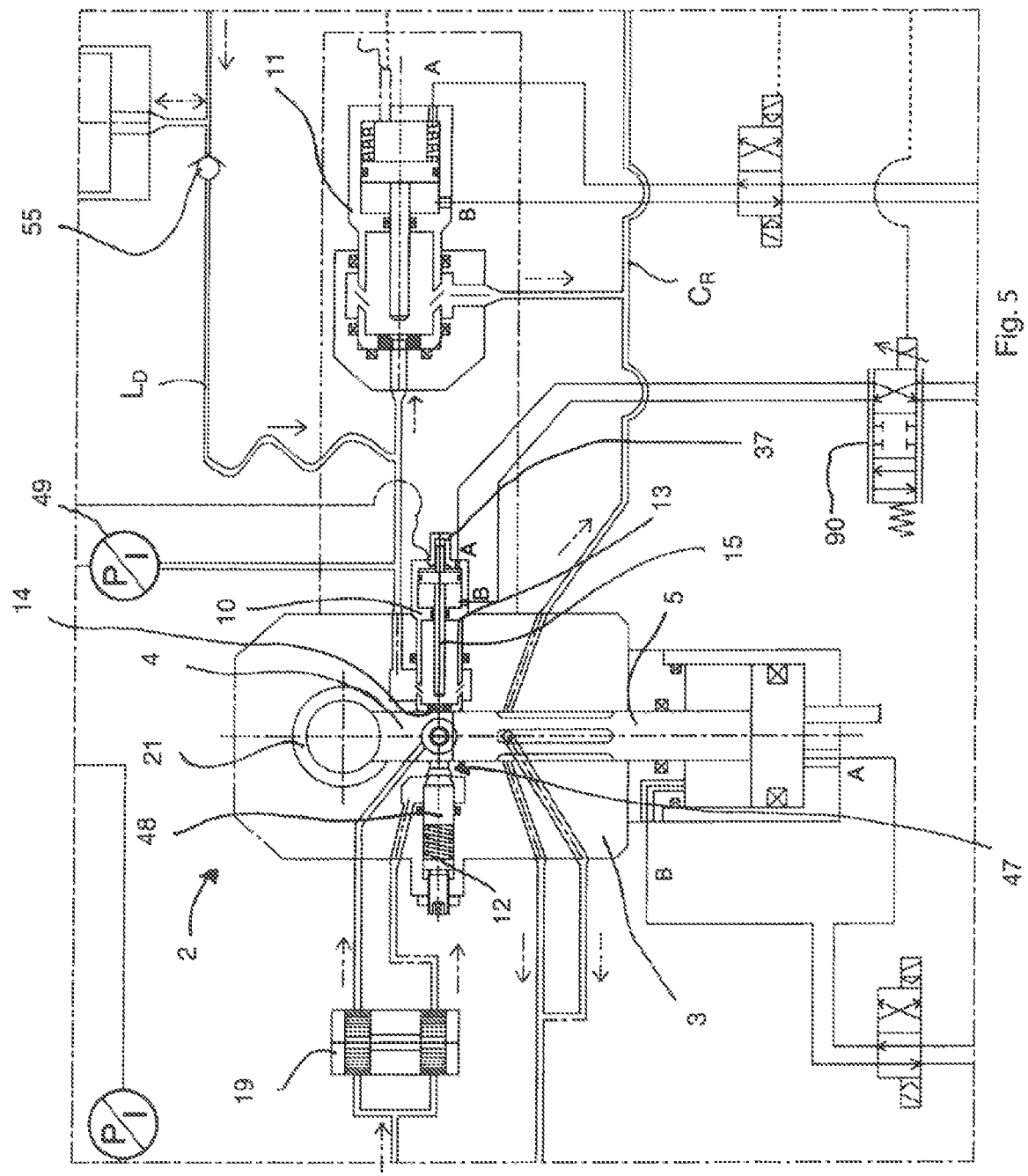
FIG. 5 is an enlarged portion of the apparatus in FIG. 3, in which are more clearly visible a section part of an "L"-shaped head, a flow divider for first polymeric component, an interception and supply injecting device and an intercepting and diverter valve device for at least one second component containing a filler.

According to another possible embodiment, with reference to FIGS. 3, 5, 6A, the mixing device 2 of the apparatus 1 is provided with a head 3 configured as an "L", i.e. with the dispensing conduit 21 that extends orthogonally with respect to the axis along which the mixing chamber 4 extends.

As shown better in FIG. 6A, in this embodiment of a high pressure mixing head 3, the mixing chamber 4 and the corresponding slide-valve 5 extend orthogonally to the dispensing conduit 21 and the latter is provided with a further slidable cylindrical member 70 (self-cleaning member), devoid of longitudinal recirculating slots, designed to self-cleaning, i.e. to the expulsion of the reagent resin residues at the end of each mixing and dispensing cycle. The slidable cylindrical member 70 is moved by a drive cylinder 71 (of hydraulic or pneumatic type or another equivalent means) placed at an upper end.

The operation of the apparatus 1 and the corresponding method in normal operation conditions not adapted to avoid damage of the filler being recirculated is now disclosed briefly.

During operation, the control unit CU controls the mechanism that drives the dosing and pumping cylinder 8 so that, by opening the on-off valve 9, loads, by retracting, the chamber 46 with a certain quantity of second polymeric component B (resin loaded with graphite or another filler) removed from the tank 7B. The resin with graphite fills the cylinder 8 by virtue of the pressure condition in which the cylinder 8 is located in the tank 7B.

At the end of the filling step, the piston 8' is stopped by the unit Cu in the retracted loading position and the sectioning valve 9 is closed.

In order to perform the dosing step, the piston 8' is commanded to advance in a controlled manner (by the hydraulic circuit or by the screw-reduction gear) to perform in succession the operations set out below.

In one low pressure recirculating operating mode (which can be simultaneous with the recirculating into the dosage circuit of the component A, which for the sake of brevity is not disclosed here), the (re-introduction) diverter valve 11 is opened and the piston 8' is commanded to advance at an appropriately set speed to recirculate the component B with flowrates that ensure low pressure and low sliding speeds but which are such as to prevent the graphite or other filler being deposited along the conduits.

In all these steps, the mixing slide-valve 5 is maintained in an advanced closed position.

When the command and control system implements the mixing and dispensing sequence, both the dosage system of the component A and the dosage system of the component B are commanded and controlled in a closed loop to dose the components A and B in the correct stoichiometric ratio.

The low pressure recirculating valves are closed and the components A and B are obliged to flow through the respective injectors installed on the mixing head 3 to be taken to the setting pressure of said injectors, generating high speed jets and kinetic energy. The aforesaid jets impinge against the walls of the recirculating slots 6 obtained longitudinally in the mixing slide-valve 5 and the flows of the components A and B are recirculated to the respective tanks 7A and 7B.

The high-pressure recirculating condition is maintained for the time necessary to permit and ensure settling and checking of pressure and flowrates (normally two or three seconds), subsequently, the control system commands the opening of the mixing slide-valve 5 by actuating mixing of the reactive components and dispensing thereof until the total set quantity is reached.

Once this programmed quantity is dispensed, the mixing slide-valve 5 is closed in an advanced position and the components A and B resume high-pressure recirculating until low pressure recirculating is restored.

The steps of high-pressure recirculating through the injector and the slot 6 of the slide-valve 5 cause progressive damage to the filler and in particular to the expandible graphite, the sheets of which get worn and break in the passage through the injector and the slots, then accumulating in the tank.

The movement of the piston 8' continues the stroke until the dosing and pumping cylinder 8 is emptied recirculating the component B along the re-introduction circuit CR.

For reloading, the movement of the piston 8' is reversed at the end of emptying of the respective cylinder 8.

The movement of the dosing piston 8' comprises stop or slowing pauses during the motion reversals, so as not to subject the loaded resin to harmful speeds inside the dosing and pumping cylinder 8.

A non-return valve 55, located downstream of the dosing and pumping cylinder 8 (the nearest possible to the latter), prevents the reflow of the resin during reloading (subsequent filling) of the cylinder 8.

The descent movement of the piston 8' (monitored by the position transducer 27) is constantly controlled by the control unit CU.

The cylinder 8 is driven to dose at flowrates lower than the dispensing flowrate (normally with flowrate equal 50% of the dispensing flowrate: this represents the normal operating mode that ensures the least damage to the graphite). Nevertheless, the cylinder 8 can be commanded to operate directly with a flowrate equal to the dispensing flowrate to shorten the time between one dosing operation and the next (represents a possible "rapid" operating mode).

The lower end of the stroke position is programmable and defined by controlling the supply of oil in the control hydraulic member, or by controlling the position of the control stem of the piston 8', or controlling the rotation of the screw or of the screw control motor. The specific operation is disclosed below or the operation of the apparatus 1 and the corresponding method so as to minimize wear of the expandible graphite or another filler during recirculation and for high-pressure dosing and dispensing of the mixed resins.

The sectioning valve 9 is opened and the piston 8' is commanded to retract such that the resin loaded with graphite fills the cylinder 8 at the pressure of the tank 7B (net of the load losses along the piping).

When the upper filling end stroke is reached, the piston 8' is stopped, and the pressure of the polymeric component B stabilises at the pressure value of the tank 7B. The sectioning valve 9 is closed again.

Motion is reversed and the piston 8' is commanded to advance at a programmed and controlled speed.

Simultaneously high-pressure dosing of the component A is commanded.

Once the dosing and pumping cylinder 8 is full, a first recirculating step can be run (along the re-introduction circuit $C_R$) to the tank 7B in low pressure conditions by opening the diverter valve 11 to the tank 7B whilst the piston 8' is commanded in closed loop mode to advance at the set speed to dose the set flowrate of the component B.

The slide-valve 5 is closed when advanced in recirculating conditions and the interception and supply device or injector 10 of the component B to the mixing chamber is closed.

Subsequently, before running the mixing and dispensing step, the supply line to the head $L_D$ is switched from the low pressure recirculating step to the pressurizing step, closing the diverter valve 11 with respect to the re-introduction circuit $C_R$ for re-introducing into the tank 7B.

In order to prevent any damage to the recirculating graphite through the effect of rubbing wear arising from the high-pressure recirculating through the interception and supply device 10 and through the slide-valve 5, the diverter valve 11 is maintained closed and at the same time also the interception and supply device 10 of the second polymeric component B is maintained closed. In this step of absence of circulation, the flowrate dispensed by the movement of the piston 8' causes the component B to be compressed within the cylinder 8 and along the supply line Lo. The elasticity of the liquid and of the pipes and the possible presence of gas dissolved in the component cause a certain flowrate to accumulate that is necessary for pressurizing the line. This step lasts roughly less than 3 seconds.

The control unit CU commands the dosing and pumping cylinder 8 by moving the piston 8' at the speed corresponding to the dispensing flowrate, whilst the assigned monitoring and control sensors/transducers of the pressure detect the pressure in the delivery line Lo.

This pressure increases in an almost linear manner because of the compressibility of the contained component and of the delivery line.

The control system detects the pressure in the delivery line Lo continuously with scans at least every 100 milliseconds or less (30 ms or less).

When the pressure reaches a threshold near the set injection pressure for the component B in the mixing chamber 4 (above 80% and about 90% of the mixing pressure for the component B (e.g. 130 bar) the control unit CU commands, for the second polymeric component B, the complete rapid opening of the interception device 10 so as to run a recirculating step (through the slots 6 of the slide-valve 5) for a much shorter time than with the isocyanate recirculating step.

The part of the graphite or of another filler that passes through the nozzle of the high pressure interception and supply device is damaged by wear through blows or rubbing and the part that recirculates in the slots 6 of the slide-valve 5 accumulates in the tank and releases particles or ground powder that can damage the reactivity of the chemistry.

In order to operate with minimum accumulated damage, the control system estimates the time remaining until the mixing pressure is reached that is set for the component B and anticipates the opening command of the slide-valve 5 (the opening movement of which occurs in a time detectable by the system and normally less than 40 milliseconds), taking account of the delay time arising from the chain of command and from the actuating time depending on the inertia of the mechanical systems.

Simultaneously, the control unit CU also actuated the precise dosage and (high-pressure) recirculation of the first polymeric component A (not loaded, e.g. isocyanate) through the respective slots 6 of the slide-valve 5.

According to this operating mode, the high-pressure recirculation through the slots 6 of the slide-valve 5 is started up for the time (as short as possible, e.g. lower than 0.5 sec) that is necessary to detect—in the corresponding recirculating slot 6 in the slide-valve 5—that also the correct flowrate of the second polymeric component B (polyol plus graphite) in the suitable stoichiometric ratio with the flowrate of the first polymeric component A (isocyanate) and ensure that said flowrate has been reached. The control system thus commands rapid opening (retracting) of the slide-valve 5 ensuring mechanical synchronization of the flows of resins at the moment of delivery into the mixing chamber 4 so as to avoid dispensing of compounds in an incorrect ratio in the initial and final dispensing steps.

With the slide-valve 5 open (retracted) the mixing of the reactive components and the dispensing to the mould start. The graphite or another filler subject to damage suffers abrasion or breakage only in this step during the transit step from the injector and whilst it impinges with the component A, which moreover avoids the blow against the walls of the mixing chamber 4.

In this manner, also the effect of the damage of the filler to reactivity of the chemistry is reduced and almost eliminated.

Owing to the aforesaid operating mode, the expandible graphite does not suffer any accumulation of damaged graphite because the passage thereof through the interception and supply device 10 and through the slots 6 of the slide-valve during the re-introduction step to the tank 7B occurs in a very short interval of time.

Owing to the solution according to the invention, it is thus possible to minimize significantly the percentages of damage of the recirculated graphite and reduce to the point of elimination the accumulation of the recirculated graphite and the relative effect of damage to the reactivity of the chemistry, preserving the high efficiency of the flame-retardant function and the reactivity of the compound that is fundamental for obtaining the desired mechanical properties.

At the end of mixing and dispensing, the slide-valve 5 is advanced to a closed position, expelling the mixture and recirculating the components through the slots 6. As soon as the slide-valve closure signal has been received, the unit Cu commands the valve 11 to open, and the interception/supply device 10 to close; the piston 8' continues its controlled dosing stroke for controlled dosing of the loaded resin, the resin being sent to the re-introduction circuit $C_R$ to reflow at reduced speed and at low pressure to the tank 7B.

The action of dosing the loaded resin by the piston 8' is interrupted at a well programmed position of the latter that can be a complete expulsion position or reversal position when a certain residual volume is reached inside the cylinder.

In sequence, new filling of the dosing and pumping cylinder 8 proceeds and then the other steps disclosed above are performed.

Normally, the flowrate is measured by the movement speed of the dosing piston 8' and the volume reduction during the stroke in the corresponding cylinder, alternatively a mass flowrate transducer is provided along the delivery line $L_D$ that leads to the mixing head 3.

The operation of the apparatus 1 disclosed below, making particular reference to the pressure trend of the polymeric components (polyol with expandable dispersed graphite and isocyanate), for a mixing and dispensing cycle and starting from an operating condition in which the piston the cylinder 8 is filled with component B. In this step, the piston 8' advances at controlled speed to actuate a dosing step with re-introduction into the respective low pressure tank by opening of the valve 9.

For the sake of simplicity, the flow rates dispensed during the re-introduction step are considered, which are constant and correspond to the mixing flowrates. In the operating practice, it is advisable for the re-introduction flowrates to be less than mixing flowrates.

The injection pressures of the polyol (loaded with graphite) and of the isocyanate are indicated respectively by "PB" and "PA".

The unit Cu, as for the component B, also activates the dosage of the component A in the set stoichiometric ratio and commands re-introduction thereof to the respective tank 7A.

With reference to FIG. 9, a graphic is shown of the (non-optimized) trend of the pressure to which the component B is subjected that is loaded with filler in a delivery line $L_D$ of stiff or hardly elasticating type, as a function of the operating status of the diverter valve 11 ("CR" line), of the interception/supply device 10 ("IP" line), and of the mixing slide-valve 5 ("MS" line).

The pressure status of the isocyanate (component A) and of the isocyanate recirculating valve 9A ("IR" line) is also shown.

The isocyanate recirculating valve 9A is closed at instant t1 to activate recirculating through the slide-valve 5 and reopened after dispensing and reclosing of the slide-valve at the instant t8.

The cycle of the loaded component B starts from a condition in which the component B is at minimum pressure $P_{BRIC}$, a low pressure recirculating (re-introduction) step is in progress along the re-introduction circuit $C_R$, which is in open condition, whereas the mixing slide-valve 5 and the interception/supply device 10 are in closed position.

Precisely, during the interval of time between an instant "t0" and an instant "t1", the isocyanate (component A) is recirculated at initially reduced pressure, and simultaneously the loaded polyol can be subjected to a re-introduction step, at low pressure, to the respective tank 7B.

For the entire interval of time from t0 to t1, the re-introduction circuit $C_R$ is in open condition, i.e. is enabled to recirculate at low pressure the component B to the respective tank 7B. This step is indicated on the diagram by the segment T1. At the instant t2, the re-introduction circuit $C_R$ is closed and maintained as such for a certain interval of time, represented by the segment T2.

The interception/supply device 10 (injector) remains closed from the initial condition (segment V1) to an instant t3 (after the instant t2) at which it is opened completely (segment V2).

The mixing slide-valve 5 remains closed from the initial condition (segment U1) to an instant t4 (after the instant t3) at which it is opened (segment U2).

At the instant "t1", the low-pressure recirculation of the isocyanate is interrupted, by acting on a corresponding intercepting valve 9A ("IR" graphic further up), the pressure thereof increases rapidly and high-pressure recirculation occurs through the respective injectors 48 and slots 6 of the mixing slide-valve 5.

Immediately afterwards, at an instant t2, the step of rapid pressurization of the loaded polyol (component B) starts, which occurs when the fluid is in a stationary condition: the polyol is stationary, is not circulating, owing to the closure of the diverter valve 11, which interrupts the re-introduction to the tank 7B after closure of both the interception and supply device or injector 10 (CR graphic) which thus prevents the flow to the delivery nozzle 14 at the corresponding recirculating slot 6 of the slide-valve 5. The loaded polyol, then undergoes a rapid pressure increase up to the value $P_B$ in static conditions, i.e. in the absence of circulation.

At a subsequent instant "t3", (graphic indicated with "IP"), when pressure near mixing pressure has been reached, complete opening of the interception and supply device 10 (or injector) is commanded, which enables the loaded polyol to access recirculation through the calibrated nozzle 14 of the injector and the slots 6 of the mixing slide-valve 5 located in an advanced position, and also the loaded polyol is subjected to recirculation through the slide-valve 5 (in a delayed manner with respect to the isocyanate, the recirculation of which is already in progress) to reach rapidly the mixing pressure PB (whereas the isocyanate has already reached the mixing pressure PA during the high-pressure recirculating that is anticipated with respect to the polyol).

The high-pressure recirculation of the loaded polyol through the slots 6 of the slide-valve 5 lasts for a much reduced time "Tf", with respect to the corresponding recirculation of the isocyanate, but the transition step is sufficient to reach the flowrate pressure necessary to achieve correct mixing and dispensing.

At an instant "t4", the slide-valve 5 is retracted to the dispensing and mixing position (graphic "MS"); the new mixing and dispensing step then commences.

When the unit Cu has measured reaching of the set dispensed reagent mixture quantity, in a subsequent instant t5 closure of the slide-valve 5 is commanded ("MS" graphic) giving rise to a subsequent components recirculating step through the slots 6 of the slide-valve 5. The step in which the slide-valve 5 remains open is represented by the segment U2; the step in which the slide-valve 5 closes again is represented by the segment U3.

Immediately afterwards, at an instant t6, the diverter valve 11 is opened (thus the re-introduction circuit CR) ("CR" graphic) and at the instant t7 closure of the interception and supply device 10 (graphic 4, "IP") is commanded. This step is represented by the segment T3.

At the instant t7 (just after the instant t6), the interception/supply device 10 is closed. This step is represented by the segment V3.

The pressure of the loaded polyol falls again rapidly to the re-introduction pressure "$P_{B-RIC}$" (low pressure in stationary condition or in condition of re-introduction to the tank 7B of the loaded polyol).

Subsequently, at the instant t8, also low-pressure recirculation of the isocyanate is commanded (comp. A).

A transition step results in which also the pressure of the isocyanate falls. The components recirculate respectively at the values "$P_{A-RIC}$" (recirculation pressure of the isocyanate at low pressure) and "$P_{B-RIC}$" (recirculation pressure of the polyol at low pressure).

The ramp $\alpha 1$ shows the pressure increase over time with the throttled line $L_D$.

The second smaller ramp $\alpha 2$ shows the pressure increase over time when the interception/supply device 10 is opened, as a result of which part of the delivered flowrate recirculates and the step of reaching the pressure is less steep.

The third descent ramp is the pressure loss of the delivery line $L_D$ arising from opening of the diverter valve 11 (circuit $C_R$) and almost simultaneous closure of the interception/supply device 10. This latter descent ramp can be made steeper by decreasing, simultaneously with closure of the mixing slide-valve 5, dispensing, e.g. to half flowrate.

The two polymeric components A, B remain at the pressures "$P_{A-RIC}$" and "$P_{B-RIC}$" for the entire standby step.

Subsequently, a step commences in which a new cycle of preparing for injection and dispensing is started.

Figure 10:
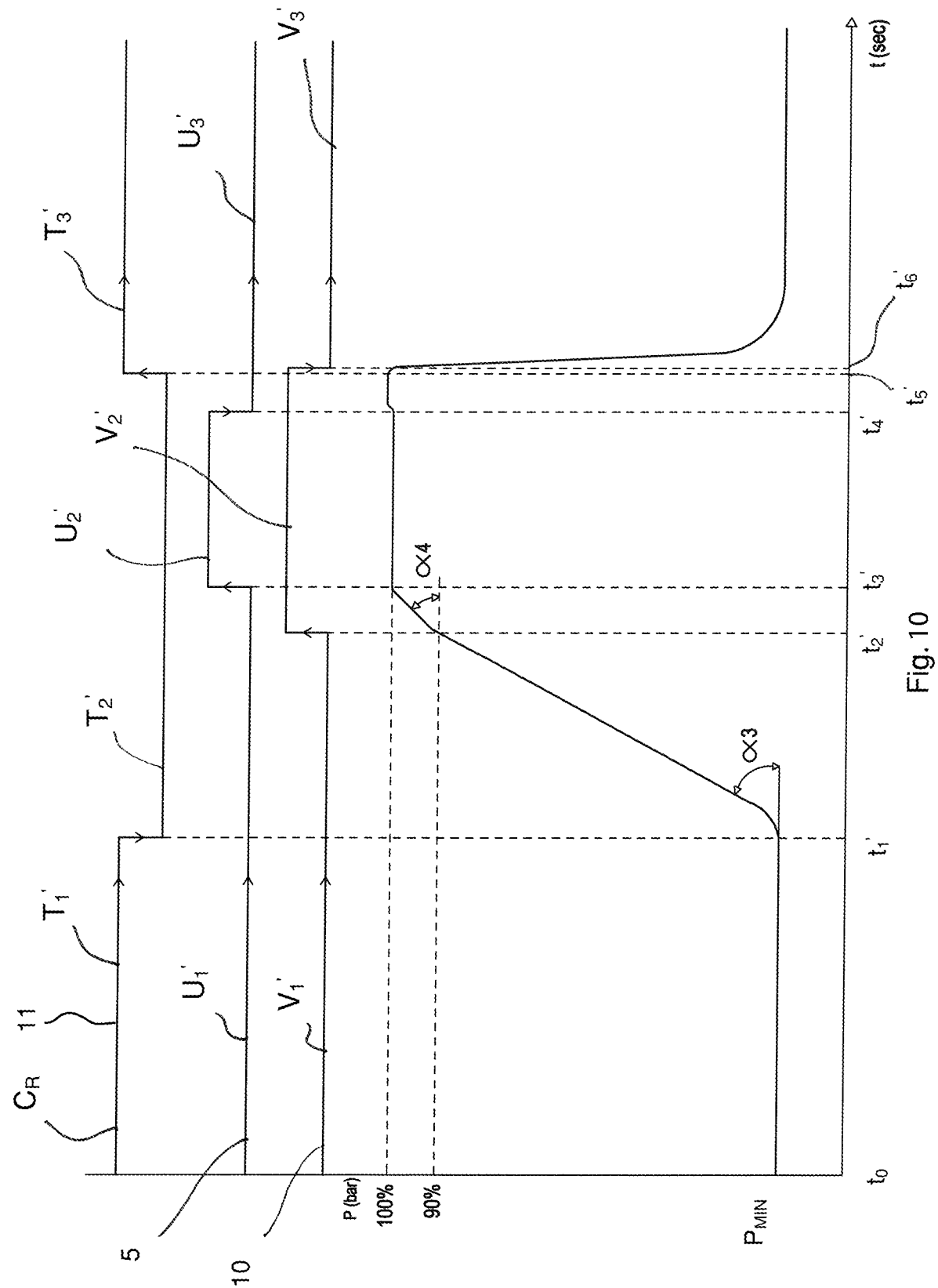
FIG. 10 is a graphic of the (non optimized) trend of the pressure like that in FIG. 9 but with a more elasticating delivery line with respect to the case of FIG. 9, due to greater dimensions and/or the presence of gas dispersed in the chemical component.

FIG. 10 shows the (non-optimized) trend of the pressure of the component B in the case of a delivery line $L_D$ characterized by line elastancy and compressibility of the component that are much higher because of the presence of dispersed gas. Similar reference signs are used to which the marks """ have been added to distinguish the graphic from that of FIG. 9.

The graphic indicating the isocyanate (component A) has been omitted.

As can be seen, the trend is similar but with a few differences, for example on the gradients $\alpha 3$ and $\alpha 4$, which are less through the effect of the greater quantity of component that is accumulated from the elasticity and compressiblity of the line $L_D$.

The apparatus 1 is provided with a system for storing and recording pressure, status and the commands of the various operating valve members (specifically the slide-valve 5, the interception and supply device 10, the diverter valve 11), disclosed previously, that are displayed on the monitor of operator panel in a graphic form similar to what is illustrated in FIG. 9. These graphics enable suitably trained operators to reschedule the intervention times of the aforesaid operating valve members so as to minimize the recirculation time of the loaded component B through the slots 6 of the slide-valve 5. In particular, the operator, once the flowrate and quantities to be dispensed ratios have been set, checks that the mixing conditions are optimum and, if they are not optimum, intervenes manually to adjust the mixing pressure values to optimize the mixing pressure values. Subsequently, in a first step, the pressure of the loaded component B is detected and stored and the graphic is displayed of the aforesaid pressure and of the diverter valve 11 and mixing slide-valve 5 commands, similarly to what is shown in FIG. 9.

In order to reduce the recirculation time of the component B through the slot 6 of the slide-valve 5, the operator can detect visually the time $T_F$ and set (anticipate or postpone) the instant t3 of opening of the valve element 10 and the instant t4 of the opening command of the slide-valve 5 by inserting a delay value of these commands with respect to the closure of the diverter valve 11 until the segment characterized by the angle $\alpha 2$ is made null, i.e. take the recirculation time a of the component B through the slots 6 of the aforesaid slide-valve 5 to virtually zero.

The apparatus 1 can be provided, in addition to what has been disclosed for the control unit CU, with an adaptive system that is able to adapt the pressurizing command times in stationary conditions of the line $L_D$, of opening command mixing slide-valve 5 and of the valve 11 reopening command after closure of the slide-valve, to minimize the accumulation of graphite or another filler damaged in the component B and to detect the compressibility of the chemical component and of the delivery line $L_D$ and also detect, by comparison, a compressibility variation, due in particular to the presence of emulsified air or another gas.

Figure 11:
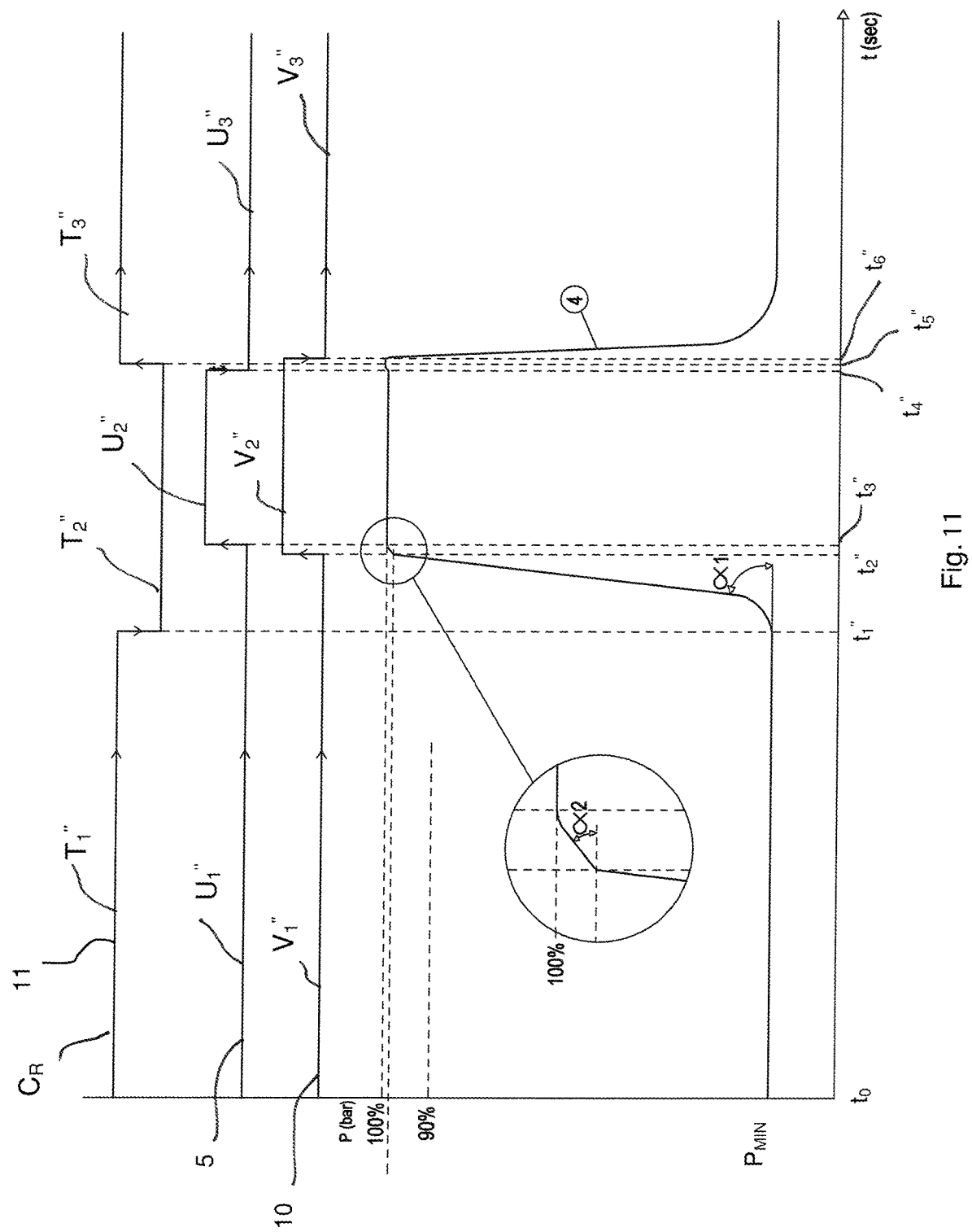
FIG. 11 is another graphic that is identical to the preceding graphs but which show the trend of the pressure that has been optimized by optimized adjustment of the control sequence.

FIG. 11 in fact shows the pressure trend of the component B in the optimized case by adaptive software, in the "stiff" line $L_D$ or hardly elasticating condition.

Similar reference signs to those in FIGS. 9 and 10 are used to which the marks """ have been added.

Compressibility of the component and of the line $L_D$ can be measured by calculating the time necessary to reach the mixing pressure, by using the ratio DeltaP/DeltaT (pressure difference P to time interval T), that, on a P-T diagram, corresponds to the tilt of the tangent of the angle $\alpha 1$ in the ascent portion of the pressure between t2 and t3 starting from the closure of the diverter valve 11 to interrupt the circulation along the re-introduction circuit $C_R$; the controller Cu samples the pressure value and referring to the time of the sampling cycle determines the time necessary for reaching the mixing pressure subsequently to the closure of the valve on the basis of the Delta P/Delta T ratio.

The adaptive system calculates the time necessary for reaching the pressure value set for opening the slide-valve (e.g. the 90% of the mixing pressure).

This time, multiplied by the flowrate, corresponds to the elasticating volume Vot that is necessary for taking the component B to the optimum pressure condition for opening the mixing slide-valve 5.

The control unit CU further stores various data relating to delay times in driving the various components, inevitably due to the command times, inertia and to other factors (for example the delay times for opening the slide-valve 5 etc.) and accordingly starts up the commands thereof to the corresponding drivings with appropriate anticipation times.

The system, during a mixing and dispensing step, detects the pressure of the delivery line $L_D$ by the pressure transducer 49 and stores it.

The trend of this value over time is displayed on the screen of the unit Cu, this value being taken from a page where it appears as shown for example in FIG. 10.

This value is compared with pressure data stored in function of the flowrate and with the value (set by the operator) of the dimension of the narrow section of the injection nozzle 14 placed on the injector 10 (interception/supply device) that delivers the component B to the mixing chamber 4.

By interpolating with the tabulated values, a predictive pressure value is calculated in function of the flowrate to be dispensed for the component B.

Likewise, the adaptive system measures, during the pressurizing step and in stationary condition as defined previously, the pressure increase in relation to time. This pressure increase over time is stored and interpolated and averaged with tabulated values in function of the flowrate.

The adaptive system calculates the time necessary for reaching the pressure value set for opening the slide-valve (e.g. the 90% of the mixing pressure).

This time, multiplied by the flowrate, corresponds to the elasticating volume Vot that is necessary for taking the component B to the pressure condition estimated as being optimum for opening the mixing slide-valve 5.

When this value is reached, the adaptive system commands the complete opening of the valve device or injector 10, detects the time $T_F$ necessary for reaching the pressure di recirculation through the slots 6 of the slide-valve 5 and detects the incremental value change of the pressure of the component B. This change derives from the passage of the resin through the injector that removes flowrate from the volume che accumulates in the elastic behaviour of the delivery line $L_D$. The control unit Cu determines this change as a difference between the tangents of the angles α1 and α2 i.e. between the increase ratios of the pressure in the time with the interception and supply device 10 closed and device 10 open and determines the time interval with which to delay the complete opening command of the device 10 to reach 100% of the mixing pressure value. The control unit Cu compares this interval with the open time of the mixing slide-valve 5 measured as a difference between opening command instant and the arrival of the variation of the proximity transducer signal installed on the mixing slide-valve 5 Tc or, alternatively, adds a set and stored time value. The system stores these values by applying a low pass digital filter algorithm of FIR type e.g. that of weighted average or of IIR type with stable coefficients.

The control unit Cu ascertains the difference of the resulting values $T_F - T_C$ on the recalculated values.

When this difference reaches a preset minimum value, the control unit Cu uses $T_F$ as a time anticipation in issuing the opening commands of the interception/supply device 10 or injector and $T_R$ for the opening command of the slide-valve 5 for subsequent dispensing.

The control unit Cu uses the open time of the slide-valve 5, which is also measured to anticipate closure of the slide-valve 5 and anticipate the opening command of the valve 11 for re-introduction of the component B with respect to reaching the precise quantity to be dispensed.

Tr being the detected and stored delay time of the slide-valve 5 movement, the anticipation of the command is determined as a quantity Mf that will be dispensed subsequently to the closure command as Mf=Qtot×Tr. This anticipated command is used to dispense the exact quantity set by the operator.

With the methods disclosed, the adaptive system, if activated, is able to minimize automatically the accumulation of damaged graphite that is recirculated through the slots 6 of the slide-valve 5 by taking this accumulation to virtually zero.

Programming the unit Cu also involves a specific programme according to which a special test cycle is run of the dimension of the particles that make up the aforesaid filler material and monitoring of particular damage to the latter. The aforesaid special test cycle assumes the use of an apposite adapted configuration of the device 10, the help of a position transducer 37 for example of potentiometer or LVDT type applied to the head 15B of the control piston of the interception/supply device 10 and the control for example of a servovalve 90 for the closed-loop control of the position of the shutter or plug element 15, or a mechanical positioning element of a contrasting member of the open position of said element 15 and comprises the steps of:
- supplying the loaded component B, at a set flowrate, to the interception/supply device 10, after closing the re-introduction circuit Cr,
- positioning with the respective hydraulic member the shutter plug element 15 with respect to the supply nozzle 14 so as to define therebetween a controlled annular passage section for the component B,
- reducing gradually the distance between the shutter plug element 15 and the supply nozzle 14 and
- monitoring continuously the pressure of the flow of the second component B upstream of the interception and supply device 10 during the reduction of the passage section and, if necessary sudden pressure spikes,
- detecting the position of the shutter plug element 15 to obtain the dimension of the passage section for the second component B and
- comparing this dimension with the data corresponding to the full non-worn filter material so as to determine, by comparison, the degree of damage to the filler material contained in the second polymeric component B.

The control system (control unit CU) of the apparatus 1 according to the invention, is also able to take account of the variation in elasticity of the component and of the line Lo because of the presence for example of emulsified gas, above all when working tanks with low levels of component, or because of temperature variations or because of modifications to the composition of the line $L_D$ (e.g. because of the application of portions of line made with piping with flexible sheathing).

The system controls the derivative of the pressure during the step of pressurization in stationary conditions of the component B i.e. the gradient or tangent of the increase ramp of the pressure and compares the derivative with the gradient measured with the tank full or in standard conditions as set by the operator.

A decrease of the delta P value divided by delta T corresponds to a certain increase in the compressibility of the delivery line $L_D$ corresponding for example to a percentage quantity of emulsified gas.

Setting $T_0$ as the time necessary to increase the pressure by 100 bar, the percentage of emulsified gas can be extrapolated according to the following formula:

$$V_{gas\ \%} = ((Q_s \times \Delta t / T_0) / V_{tot}) - V_{els}$$

Where:
$V_{gas\ \%}$=percentage of emulsified gas
$Q_s$=(cc/sec) mixing flowrate by volume
$\Delta t_{20}$=(sec) time detected to increase pressure by 20 bar starting from the closure of the recirculating valve
$T_0$=(sec) interpolated time to reach 100 bar pressure $V_{tot}$=(cc) volume of the component delivered to the head (cc)

$V_{els}$=percentage of elasticating volume due to the compressibility of the component in absence of emulsion.

The emulsified gas at the component increases the compressibility of the latter and can give rise to foam cells not conforming to specifications, small and closed cells, or generate collapsed cells.

The unit Cu is provided with an indication of the calculated percentage of emulsified gas, the percentage being conveyed to the operator or to the supervision system to check the conformity of the quality of the items produced.

Owing to this specific sequence of operating steps according to the invention, the objects stated above are achieved successfully. Precisely, the risks are minimized of accumulation of damage to the filler material (expandable graphite or another filler) dispersed inside the resins to be mixed, thus obtaining qualitatively better and higher-performing products by reaction moulding. If expandable graphite is used, a foam is obtained constantly with high flame retardant and containing capacity without deterioration of this feature.

It is possible to configure and size the apparatus 1, and parts thereof in a desired manner in function of the applications for which it is intended.

The materials, insofar as they are compatible with the specific use for which they are intended, can be chosen appropriately in function of the requested requisites and in function of the available prior art.

Variations on and/or additions to what has been disclosed above and illustrated in the attached drawings are possible without thereby falling outside the claimed scope of protection.

The invention claimed is:

1. Method for preparing and dispensing a mixture obtained by mixing at least one first chemically reactive component and at least one second chemically reactive component containing a filler material, by a high pressure mixing device comprising a mixing head provided with a mixing chamber for mixing said at least one first chemically reactive component and said at least one second chemically reactive components, inside which a slide-valve is slidable that is provided with longitudinal recirculation slots for recirculating said at least one first chemically reactive component and said at least one second chemically reactive components to respective storage tanks, wherein said second chemically reactive component containing said filler material is recirculated through said recirculation slots of said slide-valve, for a comparatively very short time with respect to a recirculating step of said first chemically reactive component through said recirculation slots, so as to avoid the accumulation of damaged filler material in a respective dosage circuit, recirculating line and tank.

2. Method according to claim 1, comprising the steps of:
withdrawing from said tank, by a pumping arrangement connected to a delivery line of the second chemically reactive component to said mixing chamber, a quantity of said at least one chemically reactive second chemically reactive component containing the filler material,
preventing, once said quantity has been withdrawn, said second chemically reactive component from flowing back directly from said pumping arrangement to the respective tank,
maintaining closed, in an advanced recirculating position, said slide-valve,
withdrawing from a tank, by the pumping arrangement, and sending to said mixing chamber a flowrate of said first chemically reactive component that is in a reaction ratio with said second chemically reactive component,
dosing, by said pumping arrangement, said second chemically reactive component and delivering said second chemically reactive component at a preset and controlled flowrate within said delivery line, and
re-entering said second chemically reactive component to the respective tank by returning said second chemically reactive component by a controlled diverter-valve,
preventing the entry of said second chemically reactive component to said slots of the slide-valve of said mixing head and
subsequently preventing the re-entry of said second chemically reactive component into the respective tank by closing said controlled diverter-valve and
pressurizing said delivery line in stationary flow conditions to subject said second chemically reactive component to a pressure increase until a pressure value is reached that is near the pressure value of injection into the mixing chamber and, subsequently,
enabling the entry of said second chemically reactive component into said mixing chamber to make said second chemically reactive component recirculate through the slots of said slide-valve at a flowrate in a reaction ratio to the first chemically reactive component,
recirculating said at least second chemically reactive component for a period of a comparatively very short time with respect to a recirculating step of said first chemically reactive component through said slide-valve and subsequently,
opening by retracting said slide-valve to permit mixing by high pressure collision of said first and second chemically reactive components and dispensing the resulting mixture in the quantity necessary for making a product by reaction moulding,
commanding the closing of said slide-valve according to the measurement of the dispensed quantity actuated by a command and control unit,
subsequently reopening said diverter-valve to re-enter the flow of said second chemically reactive component to the respective tank to recirculate said second chemically reactive component at reduced flow pressure and speed so as not to damage the filler contained in said second chemically reactive component.

3. Method according to claim 2, wherein said diverter valve for re-entry is provided along the supply line of the second chemically reactive component and is placed immediately upstream of, and in a separate position from a body of said mixing head or is fitted directly to said body of the mixing head.

4. Method according claim 2, wherein:
the step of withdrawal of the quantity of said at least one second chemically reactive component from the respective tank, of pressurizable type, is performed by driving, in a first direction, a piston of a dosing and pumping cylinder included in said pumping arrangement,
the flow between said dosing and pumping cylinder and said pressurizable tank is interrupted by driving a sectioning valve to prevent a return of the second chemically reactive component directly from the dosing and pumping cylinder to the tank,
the delivery step at a controlled speed and/or flowrate and/or increased position of said piston according to a preset flowrate is controlled by commanding said piston to be driven in a second direction opposite said first direction, and wherein the entry of the second chemically reactive component into said mixing chamber is prevented by driving an interception and supply device that is configured to enable/prevent the supply and recirculation of the second chemically reactive component through the slots of said slide-valve, and wherein said piston of the dosing and pumping cylinder is moved at a programmed and controlled speed to first start up a first low pressure recirculating step in which at least part of said quantity of said second chemically reactive component is made to flow at low pressure and speed along a re-introduction circuit to return to the respective tank without accessing the mixing head, said first low pressure recirculating step being started up by commanding said diverter-valve to deviate the circulation of the second chemically reactive component from the delivery line to the re-introduction circuit, said diverter-valve being placed along said delivery line, upstream of the interception and supply device and wherein, during said first low pressure recirculating step said slide-valve and said interception and supply device are maintained closed in an advanced position to prevent the second chemically reactive component recirculating through the respective slot of the slide-valve in the mixing head, and subsequently said diverter-valve is closed to increase the pressure of said second chemically reactive component in said delivery line at said pressure value near the pressure value of injection to the mixing chamber, and opening said interception and supply device to enable high pressure recirculation of said second chemically reactive component through the respective slot of said slide-valve.

5. Method according to claim 4, wherein said interception and supply device or injector is configured with a hollow body on which a supply and injection nozzle is obtained having a narrowed passage section that is calibrated to obtain the pressure required for mixing with the first chemically reactive component at ideal flowrate conditions for forming mixing turbulence, wherein inside said hollow body a plug-shape shutter element is reciprocal that has an end diameter that is greater than the narrowed section of the nozzle and is movable from a first position in which it closes completely said calibrated supply nozzle to a second position in which it opens completely said supply nozzle, freeing upstream of the nozzle a passage section that is greater than that of the nozzle, wherein said supply nozzle and said shutter element cooperate to enable/prevent delivery of the second chemically reactive component with no partialization of the flow thereof.

6. Method according to claim 5, wherein said supply nozzle comprises a thin wall calibrated hole, shaped for operating with a whole and non-choked passage section, wherein said shutter element has a stub end and is commanded to open completely at a distance that does not partialize the access to the aforesaid hole by freeing a passage section that is at least 40% greater than that of the nozzle and is configured to couple with said calibrated supply nozzle only to achieve complete closure of the flow, the diameter of said calibrated supply nozzle being at least 40% greater than the greatest dimension of the sheets or flakes of said filler material, and at least 80% greater than the average dimension of the granules of said filler material.

7. Method according to claim 5, wherein said plug-shape shutter element is advanced/retracted hydraulically or pneumatically to close and/or open completely the supply nozzle in a time less than 0.20 sec., so as to reduce the time during which the approach of said plug shutter element to said supply nozzle risks damaging the filler material by choking the passage section of the second chemically reactive component.

8. Method according to claim 4, wherein, in order to prevent an accumulation of damage to said filler material, said diverter-valve is closed, and the circulation of said second chemically reactive component in said re-introduction circuit is interrupted, and said interception and supply device or injector of said slide-valve is closed, for the period necessary for pressurizing the delivery line in conditions of hydraulic stability whilst the piston of said dosing and pumping cylinder is commanded to continue the stroke at the speed corresponding to the dosage flowrate requested by the mixing conditions of said at least one first chemically reactive component and said at least one second chemically reactive components.

9. Method according to claim 4, wherein said piston of said dosing and pumping cylinder is stopped or slowed during reversals of motion and during the actions of opening and closing said diverter valve and said sectioning valve to avoid the second chemically reactive component being subjected to speed and rubbing that are harmful for the filler material contained therein, the position and the speed of said piston being controlled and managed in a feedback closed loop via the command and control unit.

10. Method according to claim 4, wherein the position and speed of said piston is controlled by a position transducer and a servo valve driven in a feedback closed loop via the command and control unit.

11. Method according to claim 4, wherein the position and speed of said piston are controlled by a rotary position transducer and a reduction gear and control screw driven in a feedback closed loop via the command and control unit.

12. Method according to claim 4, wherein, after each supply of mixture, said slide-valve is closed and subsequently, with a delay reducible to a value between 0.5 sec and 0 sec, opening of said diverter valve is commanded, whilst simultaneously, or with a minimal delay, also complete closure of said interception and supply device or injector is commanded and the drive speed of the piston of the dosing and pumping cylinder is reduced.

13. Method according to claim 4, wherein, once the diverter valve is opened for the low pressure circulation step of the second chemically reactive component along the delivery line and re-introduction circuit, the piston of said dosing and pumping cylinder is driven to pump the second chemically reactive component at a lower flow rate.

14. Method according to claim 4, wherein during a mixing and dispensing step, the pressure of the second chemically reactive component inside the delivery line is automatically detected and stored by a pressure transducer installed on the delivery line, said pressure detected in function of the time and states of said slide-valve, interception and supply device, and diverter valve are displayed in the form of graphics on a display screen associated with the command and control unit, the time $T_F$ of a segment distinguished by a corner that indicates a lesser increase in the pressure time of the second chemically reactive component—once the interception and supply device is opened—is detected visually and the opening instant t3 of the interception and supply device and the opening command instant t4 of the slide-valve is set beforehand or subsequently by inserting a delay value of these commands delaying closing of the diverter valve until said segment is zeroed by making the recirculation time virtually zero of the second chemically reactive component through the slots of the slide-valve.

15. Method according to claim 4, wherein an adapting operating step is performed to minimize the accumulation of wear and damage to the filler material that involves:
   detecting the time necessary for reaching a set percentage value of the mixing pressure, in a stationary compression condition of the fluid in the delivery line and in the dosing and pumping cylinder in the closed condition of the interception and supply device, of the diverter valve and of the sectioning valve,
   comparing said time with table values in function of the flowrates of said at least one second chemically reactive component on the delivery line to the mixing head of said mixing apparatus, determining predictively the time necessary for reaching a set or detected percentage of said second chemically reactive component during the mixing step,
   using this expected time for the subsequent step of enabling the complete opening of the interception and supply device prior the opening of the slide-valve,
   checking that the pressure value obtained upon opening corresponds to the pressure value detected within the set tolerance and simultaneously that the flowrate is within an envisaged tolerance and
   commanding opening of the slide-valve,
   controlling the sum of the total quantities dispensed during the mixing step and
   commanding, at the end of supply, closing of said slide-valve,
   detecting the interval of time between the closing command and the signal of a position sensor of the slide-valve and
   commanding after said interval simultaneously the closure of the interception and supply device, and the opening of the diverter valve.

16. Method according to claim 4, wherein an adapting operating step is performed that involves:
   measuring the compressibility of said second chemically reactive component on the delivery line to the mixing head of said mixing apparatus, based on the ratio between pressure difference and a time interval necessary to reach the mixing pressure,
   monitoring, by comparison, a variation of the compressibility of said first chemically reactive component and/or of said second chemically reactive component, to detect the presence of air or another emulsified gas.

17. Method according to according to claim 1, wherein said first chemically reactive component is withdrawn from the respective tank and supplied by a single dosing pumping in the quantity and flowrate referring to the stoichiometric relation with the second chemically reactive component to said mixing head by a flow dividing device or by two distinct dosing pumps that supply two injectors that transform the pressure energy into jet energy and inject the first chemically reactive component into the mixing chamber and wherein the high pressure recirculating step of said first chemically reactive component through said slide-valve starts earlier than the high pressure recirculating step of said second chemically reactive component; and the high pressure recirculating step of said second chemically reactive component is performed, for a limited period of time, during the final part of the high pressure recirculating step of the first chemically reactive component.

18. Method according to claim 1, wherein said first chemically reactive component can be re-introduced with low pressure circulation to the respective tank during a low pressure recirculating step which provides for the second chemically reactive component to be re-introduced in the respective tank.

19. Method according to claim 1, wherein said filler material is chosen from a group comprising: expandable graphite, hollow glass microspheres, hollow or compact plastic microspheres, montmorillonite, peelable clay and graphene.

20. Method for verifying the dimension of, and monitoring possible damage to, particles that make up a filler material contained in a second chemically reactive component intended to be mixed with a first chemically reactive component for preparing and dispensing a mixture, the method providing for performing a special verification cycle with the help and application of a position transducer and the use of a position control by using a control servo valve coupled with an interception and supply device of said second chemically reactive component, in which said special verification cycle includes the steps of:
   supplying said second chemically reactive component, at a set flowrate, to said interception and supply device, after closing a re-introduction circuit for redelivery to a respective tank,
   positioning, by driving respective mechanical or hydraulic member, a plug shutter element included in said interception and supply device with respect to an associated calibrated supply nozzle so as to define therebetween a controlled annular passage section for the second chemically reactive component,
   reducing gradually the distance between said plug shutter element and said supply nozzle and
   monitoring continuously the pressure of the flow of said second chemically reactive component upstream of the interception and supply device during reduction of the passage section and, in case of sudden pressure peaks,
   detecting the position of said plug shutter element to obtain the dimension of the passage section for the second chemically reactive component and
   comparing this dimension with the data corresponding to the whole non-worn filler material so as to determine, by comparison, the degree of damage to the filler material contained in the second chemically reactive component.

21. Apparatus for preparing and dispensing a mixture, comprising
   a high pressure mixing device provided with a mixing head in which a mixing chamber is obtained for mixing at least one first chemically reactive component with at least one second chemically reactive component containing a filler material,
   in said mixing head a slide-valve being housed and slidably movable that is provided with longitudinal slots for recirculating said at least one first chemically reactive component and said at least one second chemically reactive components to respective storage tanks,
   a pumping arrangement connected to a delivery line and configured to withdrawn, from a respective tank, a quantity of said chemically reactive second chemically reactive component containing the filler material and dosing in a controlled and settable manner said second chemically reactive component towards said delivery line to the mixing head;

a sectioning valve configured to interrupt the fluid communication between said pumping arrangement and said respective tank, an interception and supply device or injector configured to permit/prevent the supply of said second chemically reactive component to the mixing chamber or the corresponding recirculating slot obtained on the slide-valve of the mixing device, a re-introduction circuit configured to redeliver said second chemically reactive component, in a low pressure and low speed condition, to the respective tank bypassing the mixing head, a diverter valve, placed upstream of the interception and supply device or injector, configured to deviate the circulation of said second chemically reactive component from said delivery line to said re-introduction circuit.

22. Apparatus according to claim 21, wherein said diverter valve is fitted directly to the body of said mixing head, in a position upstream of said interception and supply device or injector.

23. Apparatus according to claim 21, wherein said diverter valve is separated from the body of said mixing head and is provided along said delivery line in a position that is near and upstream of said interception and supply device or injector.

24. Apparatus according to claim 21, wherein said respective tank is pressurizable and wherein said pumping arrangement comprises a dosing and pumping cylinder that includes a piston that is movable in a first direction to withdraw said quantity of second chemically reactive component from said tank, and movable in a second direction opposite said first direction to send in a programmable and controlled manner the second chemically reactive component to the delivery line and/or to pressurize the second chemically reactive component, the kinematic parameters of said piston being controlled by a feedback closed loop control arrangement.

25. Apparatus according to claim 24, wherein said piston is connected to and is drivable by a hydraulic member.

26. Apparatus according to claim 24 wherein said piston is connected to, and is drivable by an electromechanical member.

27. Apparatus according to claim 21, further comprising a control unit programmed for driving said pumping arrangement at a programmed and controlled speed to first start up a first low pressure recirculating step in which at least part of said quantity of chemically reactive second chemically reactive component is made to flow at low pressure along said re-introduction circuit to return to the respective tank through said diverter valve without accessing said interception and supply device, said control unit being programmed to maintain said slide valve closed in an advanced position and said flow injector or interception and supply device during said first low pressure recirculating step to prevent the second chemically reactive component from flowing to the mixing chamber or recirculating along the respective slot of the slide-valve, and being further programmed to subsequently close said diverter valve to increase the pressure of said second chemically reactive component to the pressure value near to the pressure value of injecting into the mixing chamber, and opening said interception and supply device to permit high pressure recirculation of said second chemically reactive component through the slots of said slide-valve for a very reduced period of time and tending to zero in concomitance with a recirculating step of said first chemically reactive component through said slide-valve for a comparatively greater time, said high pressure recirculating step of said first chemically reactive component through said slide-valve being started in beforehand with respect to said second chemically reactive component.

28. Apparatus according to claim 27, wherein said control unit is programmed to subsequently open said slide-valve to permit mixing by high pressure collision of said first and second chemically reactive components and permit dispensing of the resulting mixture for the programmed quantity that is necessary to form a product by reaction.

29. Apparatus according to claim 21, wherein said mixing device comprises one or more injectors suitable for injecting said at least one first chemically reactive component inside said mixing chamber, and wherein said interception and supply device comprises a hollow body on which a supply nozzle is obtained having a passage section calibrated to obtain the requested pressure for mixing in suitable flowrate conditions for the formation by reaction of a product, inside said hollow body a plug-shaped shutter element being housed and movable that has a diameter greater than said nozzle.

30. Apparatus according to claim 29, wherein there is a single injector for injecting said first chemically reactive component, said injector being diametrically opposite said interception and supply device for said second chemically reactive component.

31. Apparatus according to claim 29, wherein two injectors are provided placed diametrically opposite for the injection of said first chemically reactive component, said interception and supply device for said second chemically reactive component being arranged in a position that is angularly comprised between the two injectors.

32. Apparatus according to claim 29, wherein a first injector of said injectors is placed diametrically opposite the interception and supply device and a second injector of said injectors is interposed in a position angularly comprised between said first injector and said interception and supply device.

33. Apparatus according to claim 29, wherein there is a flow dividing member to divide the flow of the first chemically reactive component pumped to the two respective injectors.

34. Apparatus according to claim 29, comprising two distinct dosing pumps for simultaneous pumping, along distinct circuits, of the first chemically reactive component to two injectors.

35. Apparatus according to claim 29, wherein said shutter element is movable from a first position—in which said shutter element closes said supply nozzle completely—to a second position in which the shutter element opens completely said supply nozzle, in which said supply nozzle and said shutter element cooperate to enable/prevent delivery of said second chemically reactive component without partializing the flow passage section of said second chemically reactive component that supplies said nozzle.

36. Apparatus according to claim 29, further comprising a position transducer and a servo valve arranged for detecting respectively the position and adjusting the distance of said plug shutter element with respect to said supply nozzle so as to control and detect therebetween an annular passage section for said second chemically reactive component useful for obtaining a degree of damage to the filler on the basis of the pressure variation detected at the passage of said second chemically reactive component through the partialized annular section of said supply nozzle.

37. Apparatus according to claim 21, comprising a single dosing pump for pumping said first chemically reactive component.

38. Apparatus according to claim 21, further comprising an arrangement for measuring the compressibility of said first chemically reactive component and/or of said second chemically reactive component on the delivery line to the mixing head of said mixing device, said measurement being based on a ratio between the pressure variation and a time interval necessary to reach the mixing pressure, the variation of the compressibility being indicative of the presence of air or another emulsified gas.

39. Apparatus according to claim 21, wherein said mixing device comprises a dispensing conduit for the resulting mixture, wherein said mixing head is of linear type with said dispensing conduit arranged coaxially with respect to said mixing chamber, or said mixing head is configured as an "L", with said dispensing conduit that extends orthogonally with respect to the axis along which said mixing chamber extends.

40. Apparatus according to claim 21, comprising a system for detecting, storing and viewing in graphic form the pressure of said second chemically reactive component which is filler-loaded and of opening and closing states of said slide-valve, of the interception and supply device or injector and diverter valve and of a setting function—by an operator—of the delay time between a closing of said diverter valve, a opening of said interception and supply device or injector and a opening of said mixing-slide-valve.

41. Apparatus according to claim 21, comprising an adaptive control system that is able to adapt command times of pressurizing in stationary conditions of said delivery line, command times of opening said slide-valve, command times of reopening of said diverter valve after closure of the slide-valve to minimize circulation through the slots of the slide-valve and to minimize accumulation of graphite or other filler damaged in said second chemically reactive component, said adaptive control system being configured to adapt to the delay between a closure of said diverter valve and an opening of said interception and supply device or injector to the compressibility of said second chemically reactive component and of the delivery line.

* * * * *